United States Patent
Ibrahim et al.

(10) Patent No.: US 10,804,089 B2
(45) Date of Patent: Oct. 13, 2020

(54) METHODS AND SYSTEMS FOR INTEGRATING ION MANIPULATION DEVICES

(71) Applicant: Battelle Memorial Institute, Richland, WA (US)

(72) Inventors: Yehia M. Ibrahim, Richland, WA (US); Richard D. Smith, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 16/032,651

(22) Filed: Jul. 11, 2018

(65) Prior Publication Data

US 2019/0103261 A1 Apr. 4, 2019

Related U.S. Application Data

(60) Provisional application No. 62/568,303, filed on Oct. 4, 2017.

(51) Int. Cl.
*H01J 49/00* (2006.01)
*H01J 49/06* (2006.01)
*G01N 27/62* (2006.01)

(52) U.S. Cl.
CPC .......... *H01J 49/068* (2013.01); *G01N 27/622* (2013.01); *H01J 49/061* (2013.01); *H01J 49/062* (2013.01); *H01J 49/0013* (2013.01)

(58) Field of Classification Search
CPC ...... H01J 49/068; H01J 49/061; H01J 49/062; H01J 49/0013; G01N 27/622
USPC ................................ 250/281, 282, 287–290
See application file for complete search history.

(56) References Cited

U.S. PATENT DOCUMENTS

| 3,202,995 | A | 8/1965 | Schultz |
| 3,617,908 | A | 11/1971 | Greber |
| 4,777,363 | A | 10/1988 | Eiceman et al. |
| 5,206,506 | A | 4/1993 | Kirchner |

(Continued)

FOREIGN PATENT DOCUMENTS

| AU | 2014251354 B2 | 11/2017 |
| AU | 2016320584 A1 | 4/2018 |

(Continued)

OTHER PUBLICATIONS

First Office Action for related Japanese Application No. 2018-513012, dated Aug. 2, 2018, 2 pages; with English translation, 2 pages.

(Continued)

*Primary Examiner* — Michael Maskell
(74) *Attorney, Agent, or Firm* — Klarquist Sparkman, LLP

(57) ABSTRACT

A switch for coupling a first ion manipulation device to a second ion manipulation device comprises a first surface and a second surface, at least one first electrode coupled to each of the first and second surface and configured to receive a first voltage and generate a first potential, and at least one second electrode coupled to each of the first and second surface and configured to receive a second voltage and generate a second potential, wherein the first potential inhibits the motion of ions along a first direction and the second potential inhibits the motion of ions along a second direction different from the first direction.

6 Claims, 21 Drawing Sheets

(56) References Cited

U.S. PATENT DOCUMENTS

| | | |
|---|---|---|
| 5,572,035 A | 11/1996 | Franzen |
| 5,818,055 A | 10/1998 | Franzen |
| 5,834,771 A | 11/1998 | Yoon et al. |
| 6,107,628 A | 8/2000 | Smith et al. |
| 6,322,703 B1 | 11/2001 | Taniguchi et al. |
| 6,417,511 B1 | 7/2002 | Russ, IV |
| 6,727,495 B2 | 4/2004 | Li |
| 6,744,043 B2 | 6/2004 | Loboda |
| 6,835,928 B2 | 12/2004 | Bateman |
| 6,891,157 B2 | 5/2005 | Bateman et al. |
| 6,960,760 B2 | 11/2005 | Bateman et al. |
| 7,071,467 B2 | 7/2006 | Bateman |
| 7,095,013 B2 | 8/2006 | Bateman et al. |
| 7,151,255 B2 | 12/2006 | Weiss et al. |
| 7,157,698 B2 | 1/2007 | Makarov et al. |
| 7,180,078 B2 | 2/2007 | Pau et al. |
| 7,365,317 B2 | 4/2008 | Whitehouse et al. |
| 7,391,021 B2 | 6/2008 | Stoermer et al. |
| 7,405,401 B2 | 7/2008 | Hoyes |
| 7,548,818 B2 | 6/2009 | Kieser |
| 7,786,435 B2 | 8/2010 | Whitehouse et al. |
| 7,838,826 B1 | 11/2010 | Park |
| 7,872,228 B1 | 1/2011 | Kim et al. |
| 7,888,635 B2 | 2/2011 | Belov et al. |
| 7,928,375 B1 | 4/2011 | Mangan et al. |
| 8,003,934 B2 | 8/2011 | Hieke |
| 8,049,169 B2 | 11/2011 | Satake et al. |
| 8,222,597 B2 | 7/2012 | Kim et al. |
| 8,299,443 B1 | 10/2012 | Shvartsburg et al. |
| 8,319,180 B2 | 11/2012 | Nikolaev et al. |
| 8,373,120 B2 | 2/2013 | Verentchikov |
| 8,389,933 B2 | 3/2013 | Hoyes |
| 8,410,429 B2 | 4/2013 | Franzen et al. |
| 8,581,181 B2 | 11/2013 | Giles |
| 8,658,969 B2 | 2/2014 | Nishiguchi |
| 8,698,075 B2 | 4/2014 | Kurulugama et al. |
| 8,716,660 B2 * | 5/2014 | Green .................. H01J 9/063 250/292 |
| 8,809,769 B2 | 8/2014 | Park |
| 8,835,839 B1 * | 9/2014 | Anderson .................. H01J 9/06 250/290 |
| 8,841,608 B2 | 9/2014 | Shvartsburg et al. |
| 8,901,490 B1 * | 12/2014 | Chen .................. H01J 49/062 250/290 |
| 8,907,272 B1 | 12/2014 | Wouters et al. |
| 8,907,273 B1 | 12/2014 | Chen et al. |
| 8,969,800 B1 | 3/2015 | Tolmachev et al. |
| 9,063,086 B1 | 6/2015 | Garimella et al. |
| 9,165,693 B2 | 10/2015 | Urbanus et al. |
| 9,536,721 B2 | 1/2017 | Berdnikov et al. |
| 9,704,701 B2 | 7/2017 | Ibrahim et al. |
| 9,812,311 B2 | 11/2017 | Anderson et al. |
| 9,939,409 B2 | 4/2018 | Ibrahim et al. |
| 9,966,244 B2 | 5/2018 | Anderson et al. |
| 10,139,366 B2 | 11/2018 | Atamanchuk et al. |
| 2001/0035498 A1 | 11/2001 | Li |
| 2002/0074492 A1 | 6/2002 | Taniguchi |
| 2002/0185606 A1 | 12/2002 | Smith et al. |
| 2003/0132379 A1 | 7/2003 | Li |
| 2003/0222213 A1 | 12/2003 | Taniguchi |
| 2004/0026611 A1 | 2/2004 | Bateman et al. |
| 2004/0051038 A1 | 3/2004 | Taniguchi |
| 2004/0089803 A1 | 5/2004 | Foley |
| 2004/0195503 A1 | 10/2004 | Kim et al. |
| 2004/0222369 A1 | 11/2004 | Makarov et al. |
| 2004/0251411 A1 | 12/2004 | Bateman et al. |
| 2005/0040327 A1 | 2/2005 | Lee et al. |
| 2005/0109930 A1 | 5/2005 | Hill, Jr. et al. |
| 2005/0163183 A1 | 7/2005 | Shackleton et al. |
| 2005/0258364 A1 | 11/2005 | Whitehouse et al. |
| 2006/0076484 A1 | 4/2006 | Brown et al. |
| 2006/0219896 A1 | 10/2006 | Hashimoto et al. |
| 2007/0034810 A1 | 2/2007 | Hoyes |
| 2007/0138384 A1 | 6/2007 | Keiser |
| 2007/0162232 A1 | 7/2007 | Patterson et al. |
| 2008/0073515 A1 | 3/2008 | Schoen |
| 2009/0173880 A1 * | 7/2009 | Bateman .................. H01J 9/065 250/292 |
| 2009/0206250 A1 * | 8/2009 | Wollnik .................. G01N 27/622 250/290 |
| 2009/0294662 A1 | 12/2009 | Belov et al. |
| 2009/0302209 A1 | 12/2009 | Green et al. |
| 2009/0321655 A1 | 12/2009 | Marakov et al. |
| 2010/0038532 A1 | 2/2010 | Makarov et al. |
| 2010/0294923 A1 | 11/2010 | Kenny et al. |
| 2011/0049357 A1 | 3/2011 | Giles |
| 2011/0127417 A1 | 6/2011 | Ibrahim et al. |
| 2011/0192969 A1 | 8/2011 | Verentchikov |
| 2013/0009050 A1 | 1/2013 | Park |
| 2013/0099110 A1 | 4/2013 | Hoyes et al. |
| 2013/0175441 A1 | 7/2013 | Zanon et al. |
| 2013/0313421 A1 | 11/2013 | Taniguchi |
| 2014/0061457 A1 | 3/2014 | Berdnikov et al. |
| 2014/0124663 A1 | 5/2014 | Green et al. |
| 2014/0145076 A1 | 5/2014 | Park |
| 2014/0217278 A1 | 8/2014 | Green et al. |
| 2014/0264014 A1 | 9/2014 | Ibrahim et al. |
| 2014/0299766 A1 * | 10/2014 | Anderson .................. H01J 49/062 250/290 |
| 2014/0361163 A1 | 12/2014 | Taniguchi et al. |
| 2014/0367564 A1 | 12/2014 | Green et al. |
| 2015/0028200 A1 | 1/2015 | Green et al. |
| 2015/0206731 A1 | 7/2015 | Zhang et al. |
| 2015/0340220 A1 | 11/2015 | Hock et al. |
| 2015/0364309 A1 | 12/2015 | Welkie |
| 2015/0364313 A1 | 12/2015 | Zhang et al. |
| 2016/0027604 A1 | 1/2016 | Cho et al. |
| 2016/0047728 A1 | 2/2016 | Wilson et al. |
| 2016/0049287 A1 | 2/2016 | Ding et al. |
| 2016/0071714 A1 | 3/2016 | Zhang et al. |
| 2016/0071715 A1 * | 3/2016 | Anderson .................. H01J 49/062 315/111.81 |
| 2016/0175856 A1 | 6/2016 | Paschkewitz et al. |
| 2016/0181080 A1 | 6/2016 | Williams |
| 2016/0189947 A1 | 6/2016 | Zhou et al. |
| 2016/0211129 A1 | 7/2016 | Gardner |
| 2017/0047212 A1 | 2/2017 | Kenny |
| 2017/0076931 A1 | 3/2017 | Ibrahim et al. |
| 2017/0125229 A1 | 5/2017 | Giles et al. |
| 2017/0200596 A1 | 7/2017 | Makarov et al. |
| 2018/0061621 A1 | 3/2018 | Anderson et al. |
| 2018/0068839 A1 | 3/2018 | Ibrahim et al. |
| 2018/0254178 A1 | 9/2018 | Ibrahim et al. |
| 2018/0350582 A1 | 12/2018 | Giles et al. |
| 2019/0004011 A1 | 1/2019 | Garimella et al. |
| 2019/0057852 A1 * | 2/2019 | Ibrahim .................. G01N 27/622 |
| 2019/0066993 A1 | 2/2019 | Ramsey et al. |
| 2019/0108990 A1 | 4/2019 | Prabhakaran et al. |
| 2019/0189393 A1 | 6/2019 | Ibrahim et al. |
| 2019/0369050 A1 | 12/2019 | Garimella et al. |

FOREIGN PATENT DOCUMENTS

| | | |
|---|---|---|
| AU | 2016335524 A9 | 5/2018 |
| CA | 2908936 | 10/2014 |
| CA | 2997910 | 3/2017 |
| CA | 3000341 | 4/2017 |
| CN | 1361922 | 7/2002 |
| CN | 101126738 | 2/2008 |
| CN | 102163531 | 8/2011 |
| CN | 102945786 | 2/2013 |
| CN | 201680069722 | 8/2016 |
| CN | 105264637 B | 9/2017 |
| CN | 107507751 A | 12/2017 |
| CN | 108352288 A | 7/2018 |
| DE | 112013004733 | 6/2015 |
| EP | 1566828 | 8/2005 |
| EP | 1825495 | 8/2007 |
| EP | 2065917 | 6/2009 |
| EP | 2913839 | 9/2015 |
| EP | 2984675 A1 | 2/2016 |
| EP | 3347913 A1 | 7/2018 |
| EP | 3359960 A1 | 8/2018 |

(56) References Cited

FOREIGN PATENT DOCUMENTS

| | | |
|---|---|---|
| GB | 2440970 | 2/2008 |
| GB | 2506362 | 4/2014 |
| JP | 2002-015699 | 1/2002 |
| JP | 2003514349 A | 4/2003 |
| JP | 2004-520685 A | 7/2004 |
| JP | 2006294582 A | 10/2006 |
| JP | 2009532822 | 9/2009 |
| JP | 2009535759 | 10/2009 |
| JP | 2009537070 | 10/2009 |
| JP | 2011529623 | 12/2011 |
| JP | 2012503286 | 2/2012 |
| JP | 2012528437 A | 11/2012 |
| JP | 2014049196 A | 3/2014 |
| JP | 2014509743 A | 4/2014 |
| JP | 2014509772 A | 4/2014 |
| JP | 2016514896 A | 5/2016 |
| JP | 2018-518405 | 8/2016 |
| JP | 2018528427 A | 9/2018 |
| SG | 11201801852 | 5/2016 |
| SG | 11201802494 | 8/2016 |
| SG | 11201508277 | 2/2018 |
| WO | WO 2001/35441 | 5/2001 |
| WO | WO 2006/064274 | 6/2006 |
| WO | WO 2007/133469 | 11/2007 |
| WO | WO 2010/014077 | 2/2010 |
| WO | WO 2010/032015 | 3/2010 |
| WO | WO 2011/089419 | 7/2011 |
| WO | WO 2012/116765 | 9/2012 |
| WO | WO 2012/123729 | 9/2012 |
| WO | WO 2012/123730 | 9/2012 |
| WO | WO 2013/018529 | 2/2013 |
| WO | WO 2014/048837 | 4/2014 |
| WO | WO 2014/168660 | 10/2014 |
| WO | WO 2015/056872 | 4/2015 |
| WO | WO 2015/097462 | 7/2015 |
| WO | WO 2016/069104 | 5/2016 |
| WO | WO 2017/044159 | 3/2017 |
| WO | WO 2017/062102 | 4/2017 |

OTHER PUBLICATIONS

First Office Action for related Chinese Application No. 201680065673.2, dated Sep. 30, 2018, 6 pages.
English translation of the first Chinese office action from corresponding Chinese patent application No. 201710799275.X, dated Nov. 2, 2018, 12 pages.
Written Opinion from the Intellectual Property Office of Singapore for related Application No. 11201801852Q, dated Nov. 22, 2018, 26 pages.
International Search Report and Written Opinion for related International Application No. PCT/US2018/046752, dated Dec. 4, 2018, 12 pp.
English translation of the first Chinese office action from corresponding Chinese patent application No. 201480032436.7, dated Oct. 14, 2016, 5 pages.
English translation of the search report from corresponding Chinese patent application No. 201480032436.7, dated Sep. 29, 2016, 2 pages.
European Search Report for European Patent Application No. 14782685.3, dated Oct. 25, 2016.
Examination Report No. 1 for related Australian Application No. 2016320584, dated Jun. 27, 2018, 3 pages.
First Office Action for related Canadian Application No. 2,997,910, dated May 4, 2018, 4 pages.
Hamid, Ahmed M. et al., "Characterization of Travelling Wave Ion Mobility Separations in Structures for Lossless Ion Manipulations," Analytical Chemistry, 87(22):11301-11308 (Nov. 2015).
International Search Report and Written Opinion for PCT/US2016/047070, dated Nov. 7, 2016.
International Search Report and Written Opinion issued in related International Application No. PCT/US2016/030455, dated Jul. 25, 2016, 19 pages.
International Search Report and Written Opinion for related International Application No. PCT/US2014/011291, dated Jun. 6, 2014, 2 pages.
Search Report from corresponding Singapore patent application No. 11201508277X, dated Mar. 6, 2016, 7 pages.
Tolmachev, et al., "Characterization of Ion Dynamics in Structures for Lossless Ion Manipulations," Analytical Chemistry, 86(18):9162-9168 (Sep. 2014).
Chen, et al., "Mobility-Selected Ion Trapping and Enrichment Using Structures for Lossless Ion Manipulations", Analytical Chemistry, Jan. 2016, 88, pp. 1728-1733.
Deng et al., "Serpentine Ultralong Path with Extended Routing (SUPER) High Resolution Traveling Wave Ion Mobility-MS using Structures for Lossles Ion Manipulations", Analytical Chemistry, Mar. 2017, 89, pp. 4628-4634.
Examination Report No. 2 for related Australian Application No. 2016320584, dated Sep. 3, 2018, 2 pages.
Examination Report No. 1 for related Australian Application No. 2016335524, dated May 15, 2018, 4 pages.
First Office Action for related Canadian Application No. 3,000,341, dated Jul. 30, 2018, 5 pages.
First Office Action for Chinese Application No. 201680065673.2, dated Sep. 30, 2018, 6 pages (English translation not yet available).
International Search Report and Written Opinion for related International Application No. PCT/US2018/041607, dated Sep. 20, 2018, 18 pp.
Webb et al., "Mobility-Resolved Ion Selection in Uniform Drift Field Ion Mobility Spectrometry/Mass Spectrometry: Dynamic Switching in Structures for Lossless Ion Manipulations," Analytical Chemistry, Oct. 2014, 86, 9632-9637.
Wojcik et al., "Lipid and Glycolipid Isomer Analyses Using Uitra-High Resolution Ion Mobility Spectrometry Separations", International Jouranl of Molecular Sciences, Jan. 2017, 18, 12 pp.
Written Opinion from the Intellectual Property Office of Singapore for related Application No. 11201802494Q, dated Aug. 21, 2018, 8 pages.
First Office Action mailed in Japanese Application No. 2018-216132, dated Aug. 21, 2019, 4 pages; with English translation, 4 pages.
First Office Action mailed in Japanese Application No. 2018-226767, dated Aug. 20, 2019, 2 pages; with English translation, 1 page.
Office Action corresponding to European Application No. 16754384.2, dated Sep. 11, 2019, 4 pages.
Office Action for U.S. Appl. No. 16/194,161, dated Oct. 23, 2019.
Office Action for U.S. Appl. No. 16/404,472, dated Apr. 14, 2020, 24 pages.
Written Opinion from the Intellectual Property Office of Singapore for related Application No. 11201801852Q, dated Apr. 13, 2020, 6 pages.
Office Action for European Application No. 14782685.3, dated Jan. 20, 2020.
Office Action for European Application No. 16724997.8, dated Jan. 8, 2020.

\* cited by examiner

When V1>V2>V3>V4 ions pass through the two orifices

When V4>V3>V2>V1 ions turn inside the SLIM boards ns METHODS AND SYSTEMS FOR
INTEGRATING ION MANIPULATION
DEVICES

CROSS REFERENCE TO RELATED APPLICATION

This application claims the benefit of U.S. Provisional Application No. 62/568,303, entitled METHODS AND SYSTEMS FOR INTEGRATING ION MANIPULATION DEVICES, filed on Oct. 4, 2017, which is incorporated herein by reference.

ACKNOWLEDGMENT OF GOVERNMENT SUPPORT

This invention was made with Government support under Contract DE-AC05-76RL01830 awarded by the U.S. Department of Energy, and was also made with Government support under Grant No. GM103493 awarded by the National Institutes of Health. The Government has certain rights in the invention.

TECHNICAL FIELD

This invention relates to ion manipulation. More specifically, this invention relates to the use of RF and/or DC fields to manipulate ions and/or to integrate ion manipulation devices.

BACKGROUND

The utility of mass spectrometry expands with the capability to conduct more complex ion manipulations. Current ion mobility separation (IMS) devices rely on ion optics that generate potentials to confine and guide ions along a desired direction. Drift tube ion mobility separation devices (DT-IMS), can drive ions using a static potential (or static electric field). Other ion manipulation devices, such as traveling wave ion mobility separation devices (TW-IMS), can drive ions using an oscillating potential (or dynamic electric field).

Due to the different ways that DT-IMS and TW-IMS devices drive ions, each has particular analytical strengths and weaknesses. To take advantage of the strengths of each device, it can be desirable to transfer ions between DT- and TW-IMS devices. However, it can be challenging to perform such transfers without loss of ions or to maintain consistent conditions of the sample in both devices. Integrating both devices into one instrument is challenging and requires new systems and methods.

SUMMARY

In general, embodiments of the disclosure provide systems and corresponding methods for lossless transmission of ions between drift tube IMS devices and traveling wave IMS devices.

In one representative embodiment, a switch for coupling a first ion manipulation device to a second ion manipulation device can comprise a first surface and a second surface, at least one first electrode coupled to each of the first and second surface and configured to receive a first voltage and generate a first potential, and at least one second electrode coupled to each of the first and second surface and configured to receive a second voltage and generate a second potential. The first potential can inhibit the motion of ions along a first direction and the second potential can inhibit the motion of ions along a second direction different from the first direction. In some embodiments, the second direction can be perpendicular to the first direction.

In any of the preceding or following embodiments, the switch can be configured to operate in either a first mode of operation or a second mode of operation. In the first mode of operation, the first electrode does not receive the first voltage and the second electrode receives the second voltage, such that ions in the switch move along the first direction. In the second mode of operation, the first electrode receives the first voltage and the second electrode does not receive the second voltage, such that ions in the switch move along the second direction.

In any of the preceding or following embodiments, the switch can further comprise first inner arrays of electrodes coupled to each of the first and second surface and oriented along the first direction, and second inner arrays of electrodes coupled to each of the first and second surface and oriented along the second direction. The first electrode can be an electrode of the first inner arrays of electrodes and the second electrode can be an electrode of the second inner arrays of electrodes.

In any of the preceding or following embodiments, the switch can further comprise first, second, and third outer arrays of electrodes coupled to each of the first and second surface. The first outer arrays of electrodes can be oriented parallel to and positioned adjacent to the first inner arrays of electrodes. The second outer arrays of electrodes can be oriented parallel to and positioned adjacent to one side of the second inner arrays of electrodes and the third outer arrays of electrodes can be oriented parallel to and positioned adjacent to the other side of the second inner arrays of electrodes.

In any of the preceding or following embodiments, the first and second inner arrays of electrodes can each be configured to receive a RF voltage generating a pseudopotential that can inhibit ions from approaching either of the first and second surface.

In any of the preceding or following embodiments, the RF voltage received by at least one electrode of either the first or second inner arrays of electrodes can be phase shifted with respect to the RF voltage received by a neighboring electrode to form the pseudopotential. In any of the preceding or following embodiments, the first and second inner arrays of electrodes can each be further configured to receive a superimposed DC voltage.

In any of the preceding or following embodiments, the first outer arrays of electrodes can be configured to receive a first DC voltage generating a first DC potential, the second outer arrays of electrodes can be configured to receive a second DC voltage generating a second DC potential, and the third DC voltage can be configured to receive a third DC voltage generating a third DC potential. In any of the preceding or following embodiments, at least one of the first DC voltage, the second DC voltage, or the third DC voltage can be configured to receive a DC voltage gradient.

In another representative embodiment, an ion manipulation device can comprise a drift tube portion oriented in a first direction and configured to guide ions along the first direction, a traveling wave portion oriented in a second direction different from the first direction and configured to guide ions along the second direction, a switch portion, and a controller coupled to the switch. The drift tube portion and the traveling wave portion can be positioned in a substantially T-0 shaped configuration and the switch portion can be positioned at a junction between the drift tube portion and the traveling wave portion. The drift tube portion can comprise a first drift tube portion on one side of the switch and a second drift tube portion on the other side of the switch. The switch can be configured to be operable in a first mode of operation and a second mode of operation. In the first mode of operation, ions entering the switch from the first drift tube portion can move through the switch and enter the second drift tube portion. In the second mode of operation, ions entering the switch from the first drift tube portion can move through the switch and enter the traveling wave portion.

In any of the preceding or following embodiments, the drift tube portion can comprise a first surface and a second surface, inner arrays of electrodes coupled to each of the first and second surface, and outer arrays of electrodes coupled to each of the first and second surface. The inner arrays of electrodes can be configured to receive a RF voltage generating a pseudopotential that can inhibit ions from approaching either of the first or second surface. The outer arrays of electrodes can be configured to receive a DC voltage generating a DC potential. The pseudopotential and the DC potential can manipulate the movement of ions between the first and second surface.

In any of the preceding or following embodiments, the traveling wave portion can comprise a first surface and a second surface, a first plurality of longitudinally extending continuous electrodes coupled to each of the first and second surface, and a second plurality of segmented electrodes coupled to each of the first and second surface and arrange in longitudinally extending sets between or adjacent to the first plurality of electrodes. Each electrode of the first plurality of electrodes can be configured to receive a RF voltage. Each electrode of the second plurality of electrodes can be configured to receive an AC voltage.

In any of the preceding or following embodiments, the switch can comprise a first and second surface, at least one first electrode coupled to each of the first and second surface and configured to receive a first voltage and generate a first potential, and at least one second electrode coupled to each of the first and second surface and configured to receive a second voltage and generate a second potential. The first potential can inhibit the motion of ions along the first direction and the second potential can inhibit the motion of ions along the second direction.

In any of the preceding or following embodiments, in the first mode of operation, the first electrode does not receive the first voltage and the second electrode receives the second voltage. In the second mode of operation, the first electrode receives the first voltage and the second electrode does not receive the second voltage.

In any of the preceding or following embodiments, the switch comprises first inner arrays of electrodes coupled to each of the first and second surface, oriented along the first direction and positioned in line with the inner arrays of electrodes of the drift tube portion, first outer arrays of electrodes coupled to each of the first and second surface, oriented along the first direction, and positioned adjacent to the first inner arrays of electrodes and in line with at least one of the outer arrays of electrodes of the drift tube portion, second inner arrays of electrodes coupled to each of the first and second surface, oriented along the second direction and positioned in line with the traveling wave portion, and second and third outer arrays of electrodes coupled to each of the first and second surface. The second outer arrays of electrodes can be positioned parallel to and adjacent to one side of the second inner arrays of electrodes. The third outer arrays of electrodes can be positioned parallel to and adjacent to the other side of the second inner arrays of electrodes.

The first electrode can be an electrode of the first inner arrays of electrodes and the second electrode can be an electrode of the second inner arrays of electrodes.

In another representative embodiment, a method can comprise coupling a first ion manipulation device and a second ion manipulation device to a switch, wherein the first ion manipulation device is oriented along a first direction and the second ion manipulation device is oriented along a second direction, and applying a voltage to the switch to cause ions travelling from the first ion manipulation device towards the switch to enter the second ion manipulation device after entering the switch.

In any of the preceding or following embodiments, the first ion manipulation device can be a drift tube ion manipulation device and the second ion manipulation device can be a traveling wave ion manipulation device.

In any of the preceding or following embodiments, the switch can comprise a first surface and a second surface, at least one first electrode coupled to each of the first and second surface and configured to receive a first voltage and generate a first potential, and at least one second electrode coupled to each of the first and second surface and configured to receive a second voltage and generate a second potential. Applying the voltage to the switch can comprise applying the first voltage to the first electrode.

In any of the preceding or following embodiments, the switch can further comprise first inner arrays of electrodes coupled to each of the first and second surface and oriented along the first direction, and second inner arrays of electrodes coupled to each of the first and second surface and oriented along the second direction. The first electrode can be an electrode of the first inner arrays of electrodes and the second electrode can be an electrode of the second inner arrays of electrodes.

The foregoing and other objects, features, and advantages of the disclosed technology will become more apparent from the following detailed description, which proceeds with reference to the accompanying figures.

BRIEF DESCRIPTION OF THE DRAWINGS

These and other features will be more readily understood from the following detailed description taken in conjunction with the accompanying drawings, in which.

DETAILED DESCRIPTION

Figure 1:
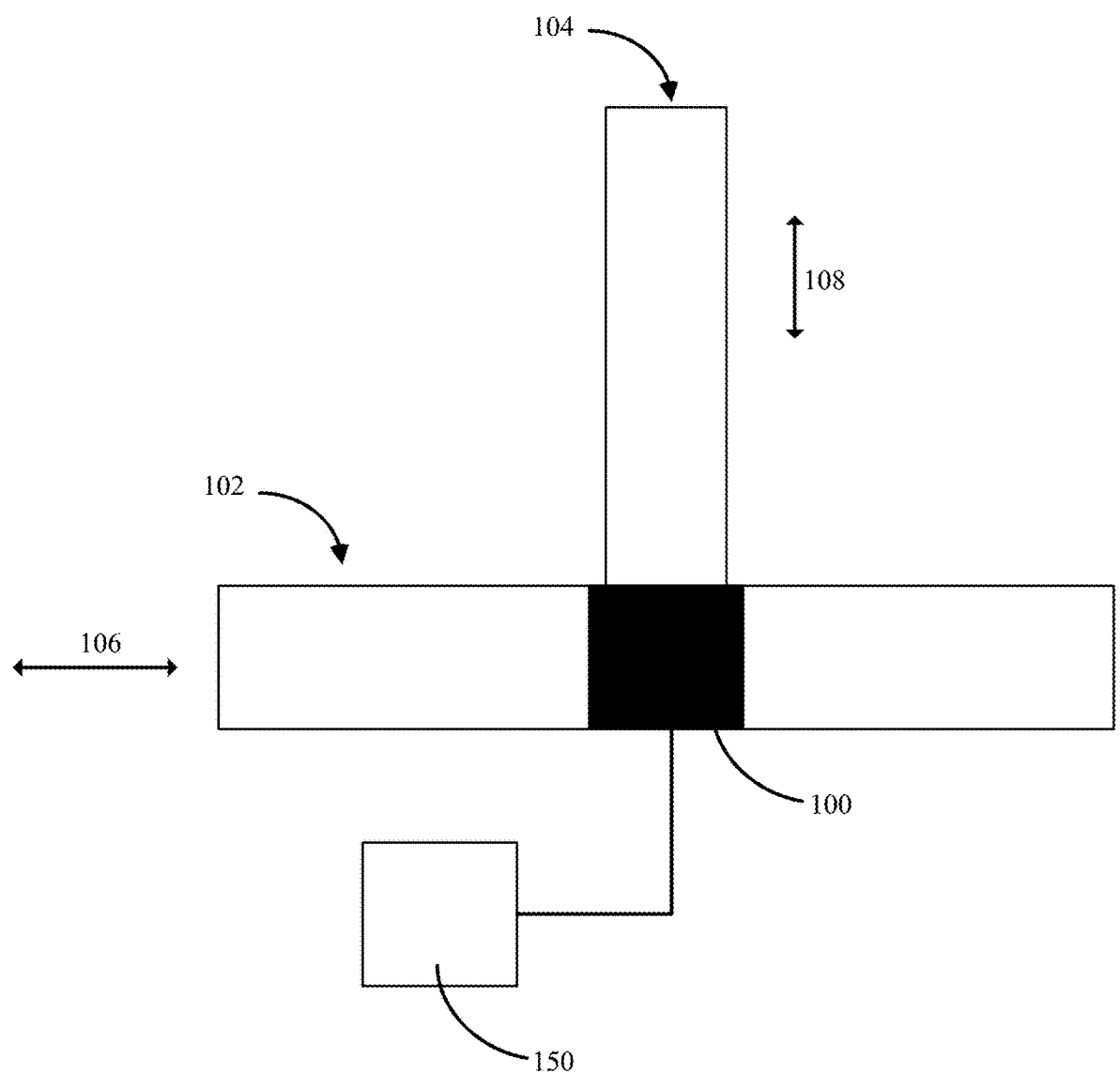
FIG. 1 is a schematic representation illustrating an exemplary embodiment of a switch that facilitates transfer of ions between two ion mobility separation devices.

Certain exemplary embodiments will now be described to provide an overall understanding of the principles of the structure, function, manufacture, and use of the systems, devices, and methods disclosed herein.

The present invention is directed to devices, apparatuses, and methods of manipulating ions. A variety of ion mobility separation devices can be used that can each offer different advantages. One such device is a drift tube ion mobility separation (DT-IMS) device. DT-IMS employs a fixed voltage drop over the length of an ion mobility separation (IMS) tube to provide a relatively weak, constant electric field under which ions move through the IMS tube. In such a device, ions are separated according to their relative mobilities when moving through a given buffer gas under the applied electric field. The mobility of ions is related to the collision cross-section of the ions with the inert buffer gas, the area around an ion in which the center of a buffer gas molecule must strike in order for a collision to occur. The collision cross-section is related to ion characteristics such as mass, size, shape, and charge. In general, ions with a relatively larger collision cross-section possess lower mobility and vice versa. Thus, by measuring the number of ions that arrive at a detector as a function of time, a spectrum of peaks and valleys can be obtained. Comparing such spectra to spectra of known ions under the measurement conditions can permit identification of the respective ions within a sample.

Another ion mobility separation device is a traveling wave ion mobility separation (TW-IMS) device. In TW-IMS, a traveling electric field waveform is employed to move ions through the IMS tube. The traveling waveform can be generated by the application of a transient and repetitive direct current (DC) voltage profile on a series of electrodes along the length of the IMS tube. The DC voltage waveform can then be time-stepped through the entire set of electrodes in steps such that an electrode receiving a high voltage at a first time step receives a low voltage at the next time step. This time-stepping can then be propagated throughout the device to create the traveling wave, typically with a simple sequence of steps repeated many times over many electrodes in the device.

DT-IMS and TW-IMS can each offer different advantages. For example, collision cross-sections of ions can be directly calculated from measurements taken using DT-IMS, which is not possible with TW-IMS without careful calibration against compounds with known collision cross-sections. However, TW-IMS generally has better ion separation resolution than DT-IMS. TW-IMS can also operate with lower voltages than DT-IMS. Therefore, it can be beneficial to have one instrument that combines DT-IMS and TW-IMS.

Embodiments of the disclosure present switches that can provide for substantially lossless transfer of ions between two ion mobility separation devices such as between a constant-field SLIM and a traveling wave SLIM. The constant-field SLIM and the traveling wave SLIM can be coupled at one or more locations, and each coupling location can include a switch. A first switch can, for example, guide ions from the constant-field SLIM to the traveling wave SLIM and a second switch can guide the ions from the traveling wave SLIM to the constant-field SLIM. The switch can reduce the potential difference between the electrodes of the constant-field SLIM and the traveling wave SLIM in the vicinity of the coupling location. In one implementation for transferring ions from a constant-field SLIM to a traveling wave SLIM, one or more electrodes of the switch can generate a potential that prevents or slows down the motion of ions in the constant-field SLIM. Additionally, a potential gradient between the constant-field SLIM and the traveling wave SLIM can be generated which can guide the ions from the constant-field SLIM to the traveling wave SLIM.

FIG. 1 is a schematic representation illustrating an exemplary embodiment of a switch 100 that couples a first ion manipulation device 102 with a second ion manipulation device 104. The switch 100 and the ion manipulation devices 102, 104 can include at least one surface (not shown) and a plurality of electrodes coupled thereto, as described herein. In alternative embodiments, the at least one surface is a single surface. In further embodiments, the at least one surface is a pair of surfaces, oriented approximately parallel to one another and offset by a gap (e.g., vertically offset).

The switch 100, the first ion manipulation device 102 and the second ion manipulation device 104 can be operated and/or controlled by a controller 150. For example, the controller 150 can include one or more voltage sources (e.g., direct current voltage sources, alternating current voltage sources, radio frequency voltage sources, and the like). The controller 150 can also alter the amplitude and phase of one or more voltages applied to the electrodes of the switch 100, and the first and second ion manipulation devices 102, 104.

The first and second ion manipulation devices 102, 104 can guide charged particles (e.g., ions) along their respective longitudinal axes. For example, the first ion manipulation device 102 can guide ions along a first axis 106, and the second ion manipulation device 104 can guide electrons along a second axis 108. Electrodes of the first and second ion manipulation devices 102, 104 can receive one or more direct current voltages, alternating current voltages, radio frequency voltages, and the like. Upon the reception of the various aforementioned voltages, the electrodes of the first and second ion manipulation devices 102, 104 can confine the ions along a first direction (e.g., limited to a region defined by the arrangement electrodes of the manipulation device) and drive the ions along a second direction (e.g., along the first axis 106 or along the second axis 108).

Embodiments of the switch 100 can guide ions from the first ion manipulation device 102 to the second manipulation device 104 or vice versa. For example, ions traveling along the first axis 106 in the first manipulation device 102 can be directed to travel along the second axis 108 of the second manipulation device 104. This can be done, for example, by manipulating one or more voltages applied to electrodes of the switch 100, and the first and second ion manipulation device 102, 104.

As discussed in greater detail below, constant-field SLIM and traveling wave SLIM devices can include a pair of surfaces (e.g. substantially parallel to each other) that define a channel through which ions can be guided. The surfaces can include a plurality of electrodes that can receive various voltages (e.g., DC voltage, AC voltage, RF voltage) and generate a potential that confines the ions (e.g., between the pair of surfaces, along a lateral axis, and the like).

Figure 2:
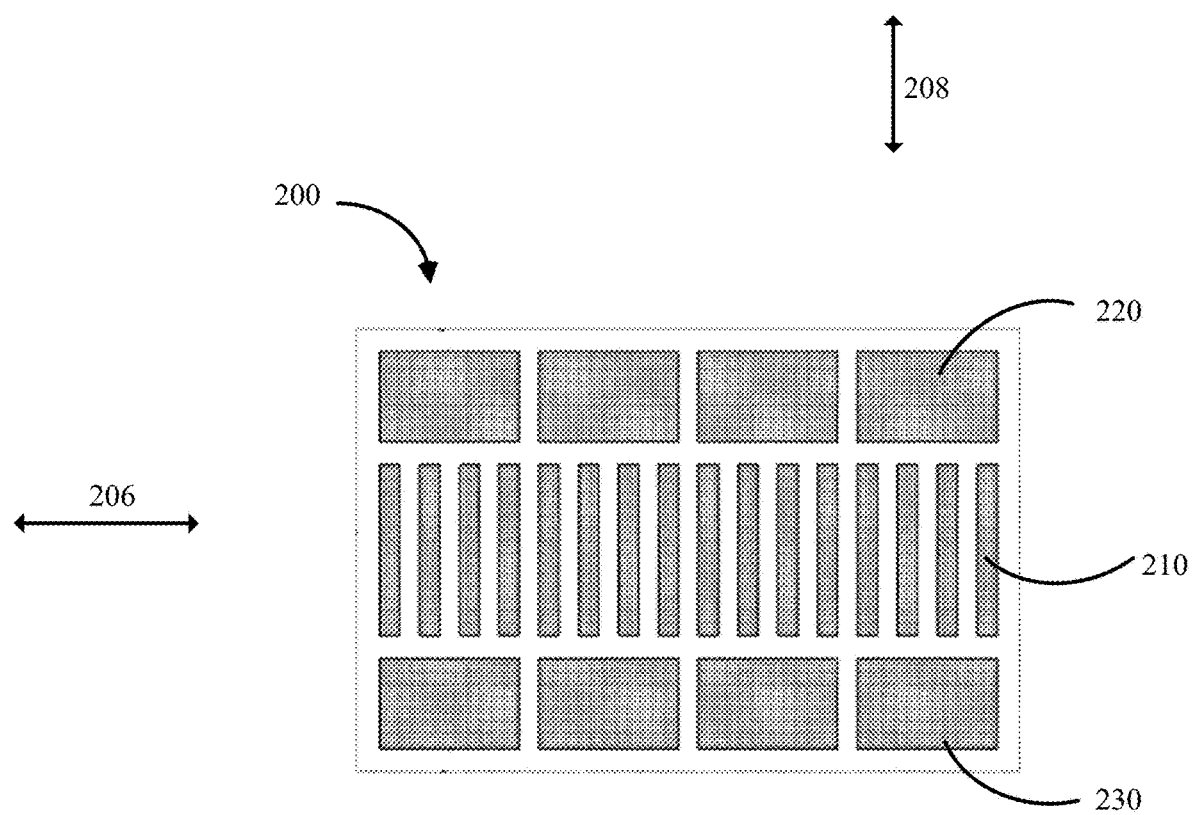
FIG. 2 is an illustration of an exemplary embodiment of a surface of a drift tube structure for lossless ion manipulation (SLIM) device.

FIG. 2 is an illustration of a surface 200 of an exemplary constant-field SLIM device. In some examples, the SLIM device of FIG. 2 can be a SLIM device as disclosed in U.S. Pat. No. 9,812,311, which is hereby incorporated herein by reference in its entirety.

Referring to FIG. 2, the surface 200 includes an inner array of electrodes 210, a first outer array of electrodes 220 and a second outer array of electrodes 230. The inner and outer arrays of electrodes 210, 220, 230 are arranged along a longitudinal axis 206. The outer arrays of electrodes 220, 230 (also referred to as "guard electrodes") can each receive a DC voltage and generate a DC potential that confines the ions to the region between the first outer array of electrodes 220 and the second outer array of electrodes 230. The inner array of electrodes 210 (also referred to "rung electrodes") can receive a radiofrequency (RF) voltage, with the RF voltage applied to each electrode being out of phase with the RF voltage applied to adjacent electrodes to generate a pseudopotential. The pseudopotential can repel the ions away from the surface 200 and confine ions between the surface 200 and an adjacent parallel surface (not shown). The frequency of the RF potential applied to the inner array of electrodes 210 can range from about 0.1 kHz to 50 MHz. The inner array of electrodes 210 can also receive a superimposed DC voltages. For example, DC voltages received by the electrodes of the inner array of electrodes 210 can decrease along the longitudinal axis 206. This can result in the generation of a static potential profile by the inner array of electrodes 210 along the longitudinal axis 206. The generated static potential can drive ions along the longitudinal axis 206.

Figure 3:
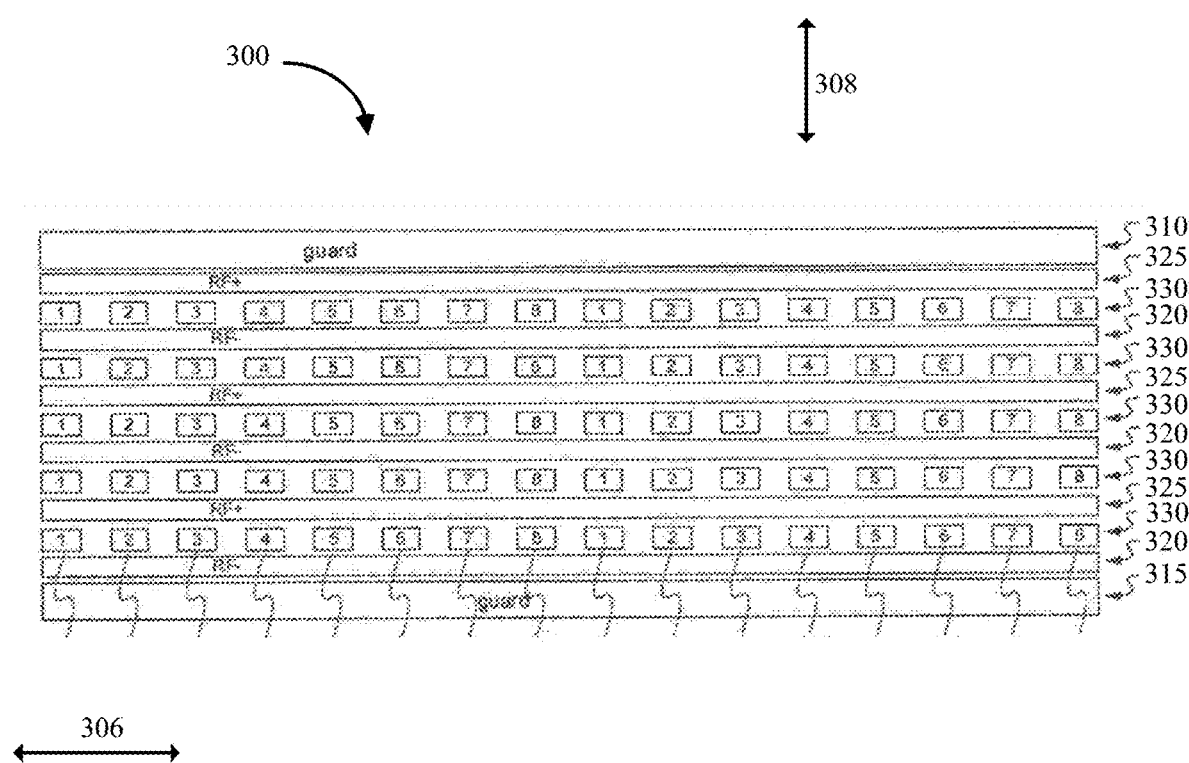
FIG. 3 is an illustration of an exemplary embodiment of a surface of a traveling wave SLIM device.

FIG. 3 is an illustration of a surface 300 of an exemplary traveling wave SLIM device. In some examples, the SLIM device of FIG. 3 can be an AC-SLIM device as disclosed in International Patent Publication No. WO 2017/062102, which is hereby incorporated herein by reference in its entirety.

Referring to FIG. 3, the surface 300 includes at least one first outer electrode 310 and at least one second outer electrode 315. The first and second outer electrodes 310, 315 (also called "guard electrodes") can each receive a constant DC voltage and can confine ions along the lateral direction 308 in the region between the electrodes 310, 315.

The surface 300 also includes a plurality of continuous electrodes 320 and 325 and a plurality of arrays of segmented electrodes 330. The plurality of continuous electrodes 320, 325 can also be referred to as RF electrodes. Each of the continuous electrodes 320, 325 is generally elongated and continuous, extending along at least a portion of a length of the surface 300. In some examples, the continuous electrodes 320, 325 extend along the entire length of the surface 300. The plurality of electrodes 320, 325 can be positioned in an alternating fashion along a width of the surface 300 (e.g., along direction 308). The surface 300 can contain any number of continuous electrodes 320, 325.

Each of the electrodes 320, 325 can be in electrical communication with an RF voltage source (not shown in FIG. 3). RF voltages can be applied to adjacent electrodes 320, 325 approximately 180° out of phase with respect to each other. That is, an RF voltage can be applied to the electrodes 320 that is 180° out of phase with the RF voltage applied to the electrodes 325. Thus, the charge on laterally adjacent ones of the electrodes 320, 325 at any given time is of opposite polarity, as indicated by the designations RF+ and RF− in FIG. 3. As time advances, the polarity of each of the electrodes 320, 325 can switch, transitioning from positive to negative or from negative to positive.

The arrays of segmented electrodes 330 can be interposed between the continuous electrodes 320 and 325. The arrays of segmented electrodes 330 can be spaced to span the entire length of the surface 300 or any portion thereof. Each of the arrays 330 can contain any number of electrodes. The inner arrays of electrodes 330 can receive an alternative current (AC) voltage that generates an oscillating potential, thereby creating a traveling wave that can drive ions along the longitudinal axis 306.

As explained above, a constant-field SLIM (e.g., a device having surface 200 of FIG. 2) and a traveling wave SLIM (e.g., a device having surface 300 of FIG. 3) each have certain advantages and disadvantages. Accordingly, it can be desirable to combine a constant-field SLIM and a traveling wave SLIM. A switch can be positioned at the junction between the constant-field SLIM and the traveling wave SLIM to couple the two SLIMs together and control the movement of ions between them. In other examples, it can be desirable to combine two constant-field SLIMs or two traveling wave SLIMs with a switch positioned at the junction between the two devices to control the movement of ions therebetween.

Figure 4:
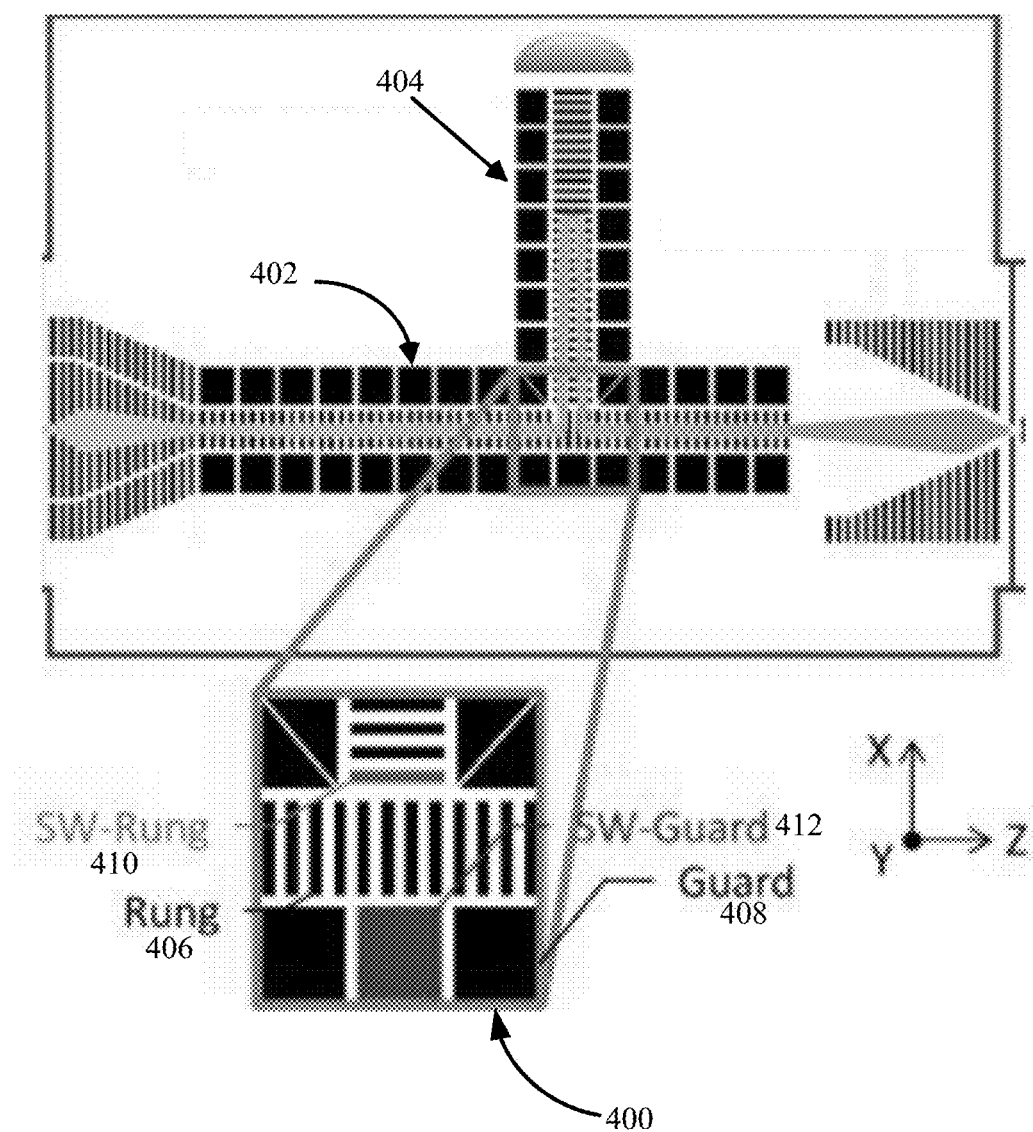
FIG. 4 is a schematic representation illustrating an exemplary embodiment of a switch configured to provide substantially lossless transfer of ions between two constant-field SLIM devices.

FIG. 4 is a schematic representation illustrating a switch 400 that couples a first constant-field SLIM 402 with a second constant-field SLIM 404. The first and second constant-field SLIMs 402, 404 can each comprise parallel surfaces similar to surface 200 of FIG. 2. For purposes of illustration, only one surface is shown in FIG. 4. As shown in FIG. 4, the switch 400 can comprise a plurality of rung electrodes 406 similar to rung electrodes 210 of FIG. 2 and a plurality of guard electrodes 408 similar to guard electrodes 220, 230 of FIG. 2. The switch 400 can also comprise switching electrodes SW-Rung electrode 406 and SW-Guard electrode 408. These electrodes can be individually controlled, separately from the other electrodes of constant-field SLIMs 402, 404.

In the example of FIG. 4, constant-field SLIM 402 and constant-field SLIM 404 are arranged substantially perpendicular to each other with the switch 400 located at the junction between them. In other examples, the constant-field SLIMs 402, 404 can be arranged in other configurations with the switch 400 arranged at their junction. In the example of FIG. 4, the SW-Guard electrode 408 can be positioned in line with the center of the constant-field SLIM 404 and the SW-Rung electrode 406 can be positioned adjacent to the Rung electrodes 406.

The switch 400 can be used in at least two modes of operation. In a first mode of operation, the switch 400 can guide ions that enter the switch from the constant-field SLIM 402 such that they continue along the path of the constant-field SLIM 402. In a second mode of operation, the switch 400 can guide ions that enter the switch from the constant-field SLIM 402 such that they turn and enter the constant-field SLIM 404. In the first mode of operation, a potential can be applied to SW-Rung electrode 410 such that a potential barrier prevents ions in the switch 400 from entering the constant-field SLIM 402. In the second mode of operation, this potential can be removed from the SW-Rung 410 and a potential can be applied to the SW-Guard electrode 412 that is greater than the potential applied to the adjacent Guard electrodes 408 such that ions in the switch 400 will be guided by this potential into the constant-field SLIM 404. The switch 400 can be controlled such that it can switch between these two modes of operation to appropriately direct ions between the constant-field SLIMs 402, 404.

Figure 5:
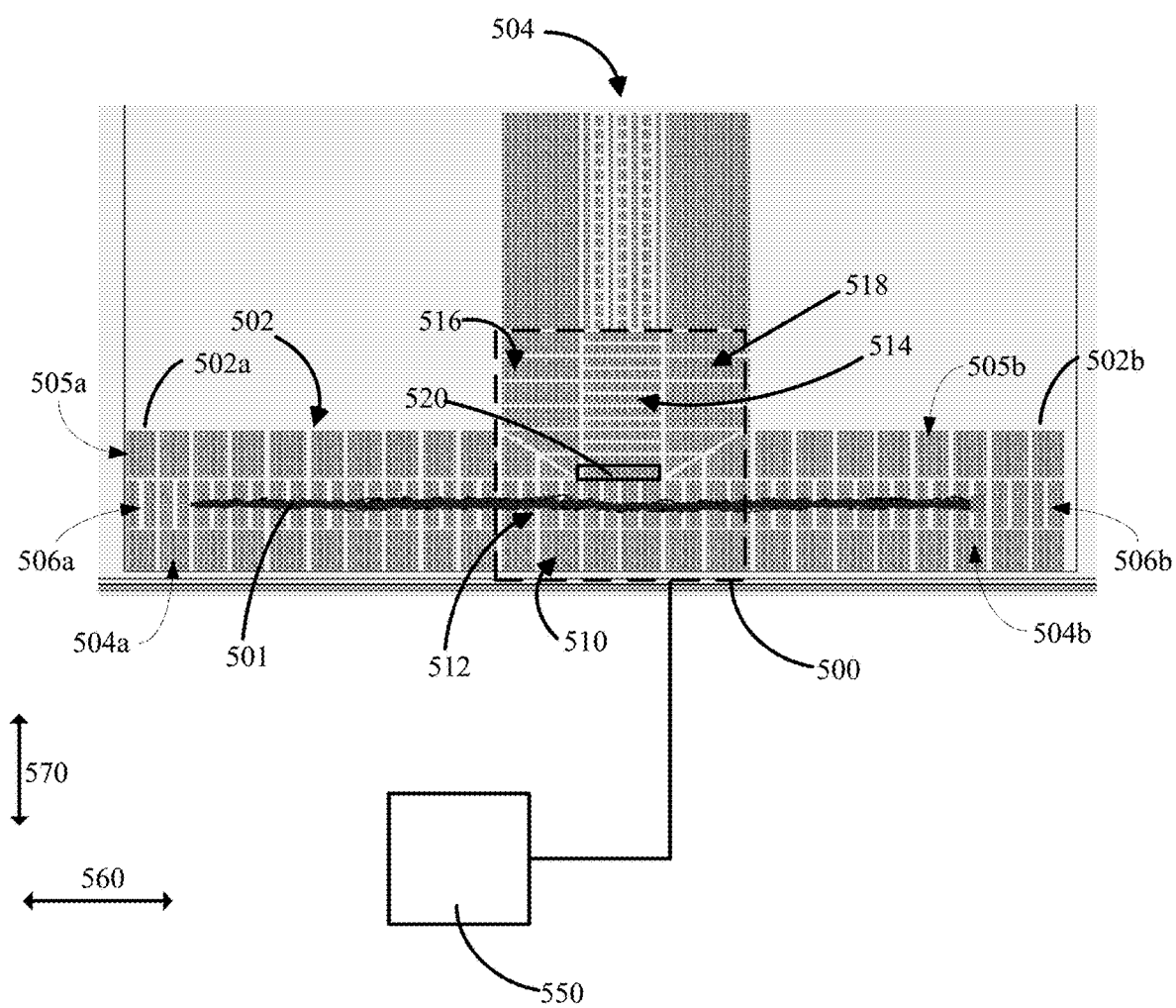
FIG. 5 is a schematic representation illustrating another exemplary embodiment of a switch configured to provide substantially lossless transfer of ions between a constant-field SLIM device and a traveling wave SLIM device, in a first mode of operation.
Figure 6:
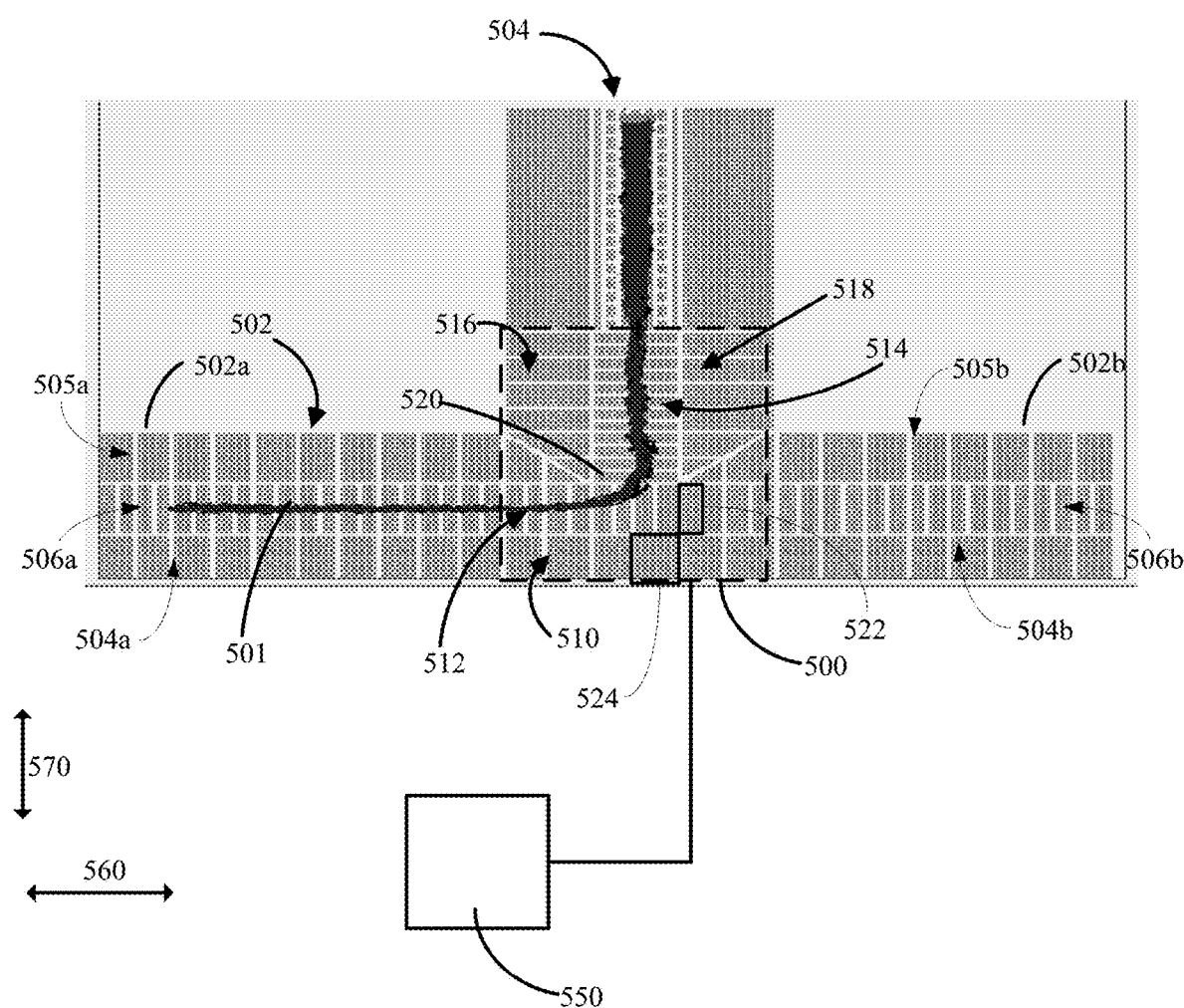
FIG. 6 is a schematic representation illustrating a second mode of operation of the switch of FIG. 5.

FIGS. 5-6 are schematic representations illustrating an exemplary switch 500 that couples a constant-field SLIM 502 with a traveling wave SLIM 504. The constant-field SLIM 502 and the traveling wave SLIM 504 can comprise parallel surfaces similar to surface 200 of FIG. 2 and surface 300 of FIG. 3, respectively. For purposes of illustration, only one such surface is shown in FIGS. 5-6. FIG. 5 illustrates the switch 500 in a first mode of operation and FIG. 6 illustrates the switch 500 in a second mode of operation, as described herein.

In the illustrated example of FIGS. 5-6, the constant-field SLIM 502 and the traveling wave SLIM 504 are oriented substantially perpendicular to each other in a T-shaped configuration. In other examples, the constant-field SLIM 502 and the traveling wave SLIM 504 can be oriented at other angles with respect to each other. The switch 500 can comprise a junction between the constant-field SLIM 502 and the traveling wave SLIM 504. The switch 500 can include electrodes that can generate potentials that can guide ions from the constant-field SLIM 502 to the traveling wave SLIM 504 and vice versa. The voltages applied to the various electrodes of the switch 500 can be modified by a controller 550 to alter the path of ions through the constant-field SLIM 502 and the traveling wave SLIM 504, as disclosed herein.

The constant-field SLIM 502 can comprise a first portion 502a positioned one side of the switch 500 (the left side of the switch in FIG. 5) and a second portion 502b positioned on the other side of the switch (the right side of the switch in FIG. 5). The first portion 502a can comprise arrays of guard electrodes 504a, 505a similar to guard electrodes 220, 230 of FIG. 2 and an array of rung electrodes 506a similar to rung electrodes 210 of FIG. 2. Likewise, the second portion 502b can comprise arrays of guard electrodes 504b, similar to guard electrodes 220, 230 of FIG. 2 and an array of rung electrodes 506b similar to rung electrodes 210 of FIG. 2.

The switch 500 can comprise an outer array of guard electrodes 510 similar to guard electrodes 504a, 504b and an inner array of rung electrodes 512 similar to rung electrodes 506a, 506b. The arrays of guard electrodes 510 can be positioned in between and in line with the arrays of electrodes 504a, 504b and the arrays of rung electrodes 512 can be positioned in between and in line with the arrays of electrodes 506a, 506b. The controller 550 can apply a DC voltage to the guard electrodes 510 such that they generate a static DC potential that can prevent ions 501 in the switch 500 from drifting away from the traveling wave SLIM 504 along direction 570 (down in the orientation of FIGS. 5 and 6). In some examples, a DC voltage gradient can be applied to the guard electrodes 510 such that a successively lower voltage is applied to each electrode moving from left to right (or moving from right to left in other examples). This can create a voltage gradient to force the ions 501 to move from left to right.

The controller 550 can apply a RF voltage and a superimposed DC voltage to the rung electrodes 512. The RF voltage applied to each of the rung electrodes 512 can be out of phase with its two neighboring electrodes in order to generate a pseudopotential. That is, a RF voltage with opposite polarity can be applied to adjacent electrodes. This can cause the ions 501 to be confined between the two surfaces of the switch 500. The applied voltages can also control the motion of the ions 501 as they move along the longitudinal axis 560. For example, a DC voltage gradient can be applied to the rung electrodes 512 to. The rung electrodes 512 can be positioned adjacent to and parallel to the guard electrodes 510.

The switch 500 can further comprise arrays of electrodes 514, 516, 518. The arrays of electrodes 514 can be positioned in line with the traveling wave SLIM 504. The controller 550 can apply a RF voltage and superimposed DC voltage to the array of electrodes 514. The RF voltage applied to the adjacent electrodes 514 can be of opposite polarity, similar to the RF voltage applied to the electrodes 512, in order to generate a pseudopotential and confine the ions 501 between the surfaces of the switch 500. The voltages applied to the electrodes 514 can also guide the ions along the lateral direction 570 to the traveling wave SLIM 504. In the illustrated example, the array of electrodes 514 is positioned perpendicular to the array of electrodes 512. In other examples, the array of electrodes 514 can be positioned at other angles with respect to the array of electrodes 512.

The controller 550 can further apply a DC voltage to electrodes 516, 518 that can generate a DC potential that can confine ions traveling from the switch 500 to the traveling wave SLIM 504 to the space between arrays of electrodes 516, 518. The arrays of electrodes 516, 518 can be arranged parallel to and adjacent to the array of electrodes 514, with the array of electrodes 514 position in between the arrays of electrodes 516, 518.

As discussed above, the controller 550 can control the operation of the electrodes of the switch 500 and/or electrodes in constant-field SLIM 502 and traveling wave SLIM 504. For example, the controller 550 can include an AC voltage source, a DC voltage source, and/or an RF voltage source. The controller 550 can determine the magnitude and/or phase of the voltage applied to the various electrodes. The controller 550 can also determine the time duration for which a voltage is applied to an electrode. The controller 550 can also determine the sequence in which one or more electrodes have a voltage applied ("turned on") or removed ("turned off"). For example, the controller 550 can turn certain electrodes on or off to operate the switch 500 in either a first mode of operation or a second mode of operation. In the first mode of operation, ions can travel from the first part 502a of the constant-field SLIM 502, through the switch 500 and enter the second part 502b of the constant-field SLIM, while in the second mode of operation, ions can travel from the first part 502a of the constant-field SLIM, through the switch and enter the traveling wave SLIM 504, as discussed in further detail below.

In the first mode of operation, as illustrated in FIG. 5, one or more switching electrodes of the electrode array 514 can generate a potential barrier (e.g., a region of high potential compared to the ambient potential) that can impede the motion of ions 501 towards the traveling wave SLIM 504. In some examples, a single electrode 520 can be a switching electrode to generate this potential barrier. In other examples, additional electrodes of the electrode array 514 can be switching electrodes to generate the potential barrier. When this potential barrier is applied, ions are prevented from veering off the longitudinal axis 560 toward the traveling wave SLIM 504 such that the ions will continue to travel along the longitudinal axis 560 through the switch 500.

In the second mode of operation, as illustrated in FIG. 6, one or more switching electrodes of the electrode arrays 510, 512 can generate a potential barrier, as described herein. In some examples, the switching electrodes comprise electrode 522 of the second array of electrodes 512 and electrode 524 of the first array of electrodes 510. In the example of FIG. 6, the electrode 522 is positioned just past the ends of the electrodes of array 514 along direction 560 (to the right of electrode array 514 in the orientation of FIG. 6). Thus, the potential generated by the electrode 522 can act as a potential barrier that can prevent ions traveling from first part 502a of the constant-field SLIM 502 to the second part 502b of the constant-field SLIM 502. The potential generated by the electrode 524 can drive the ions from the switch 500 to the traveling wave SLIM 504. In some implementations, the constant-field SLIM 502 can be at a higher potential than the traveling wave SLIM 504. Additionally, the potential generated by the electrodes of the switch 500 can serve as a potential bridge between the constant-field SLIM 502 and the traveling wave SLIM 504. For example, the electrodes of the switch 500 that are positioned closer to the constant-field SLIM 502 can have a potential similar to that of constant-field SLIM 502, and electrodes of the switch 500 that are positioned closer to the traveling wave SLIM 504 can have a potential similar to that of the traveling wave SLIM 504.

Figure 7:
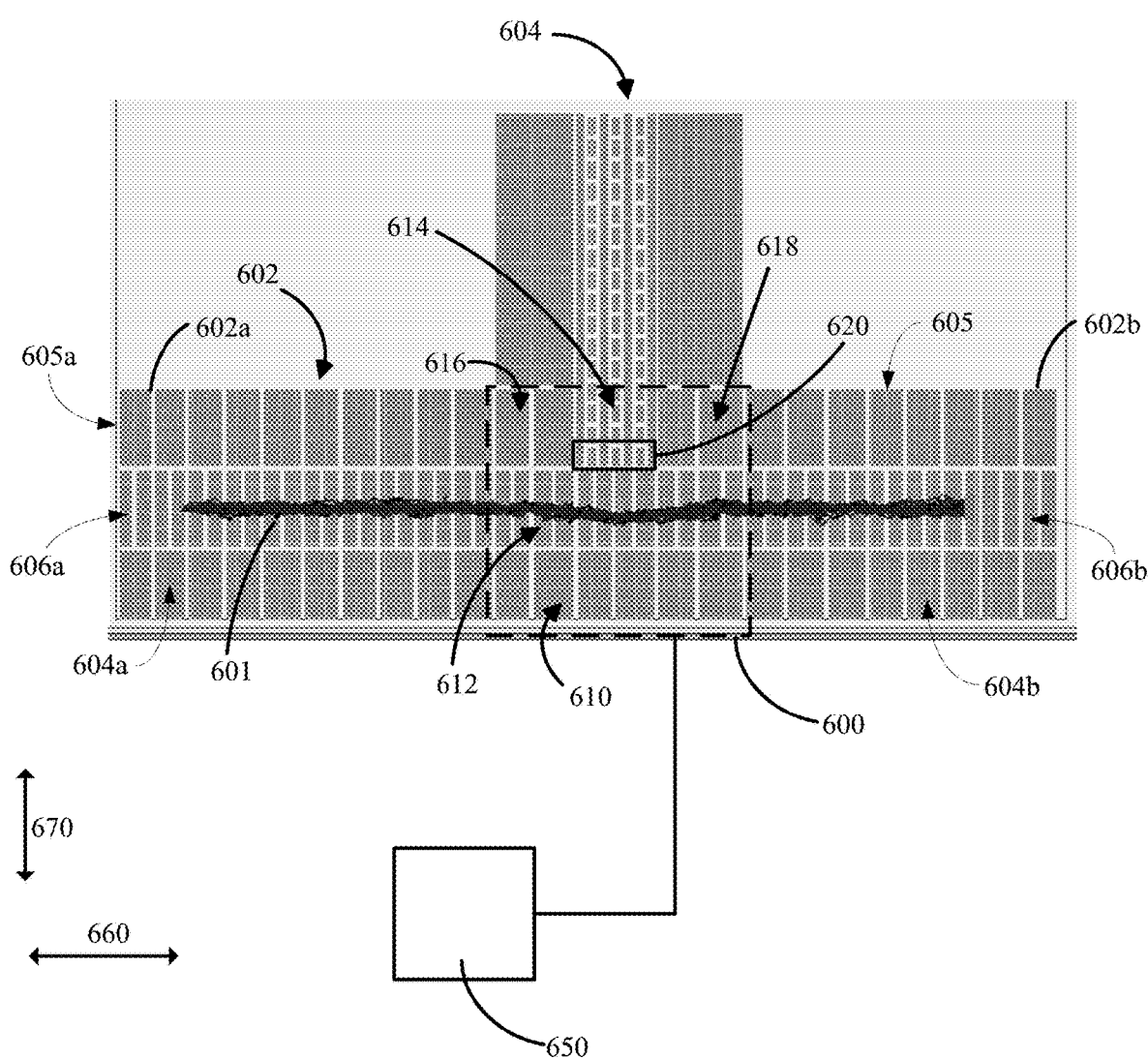
FIG. 7 is a schematic representation illustrating a first mode of operation of another exemplary switch that integrates a constant-field SLIM device with a traveling wave SLIM device.
Figure 8:
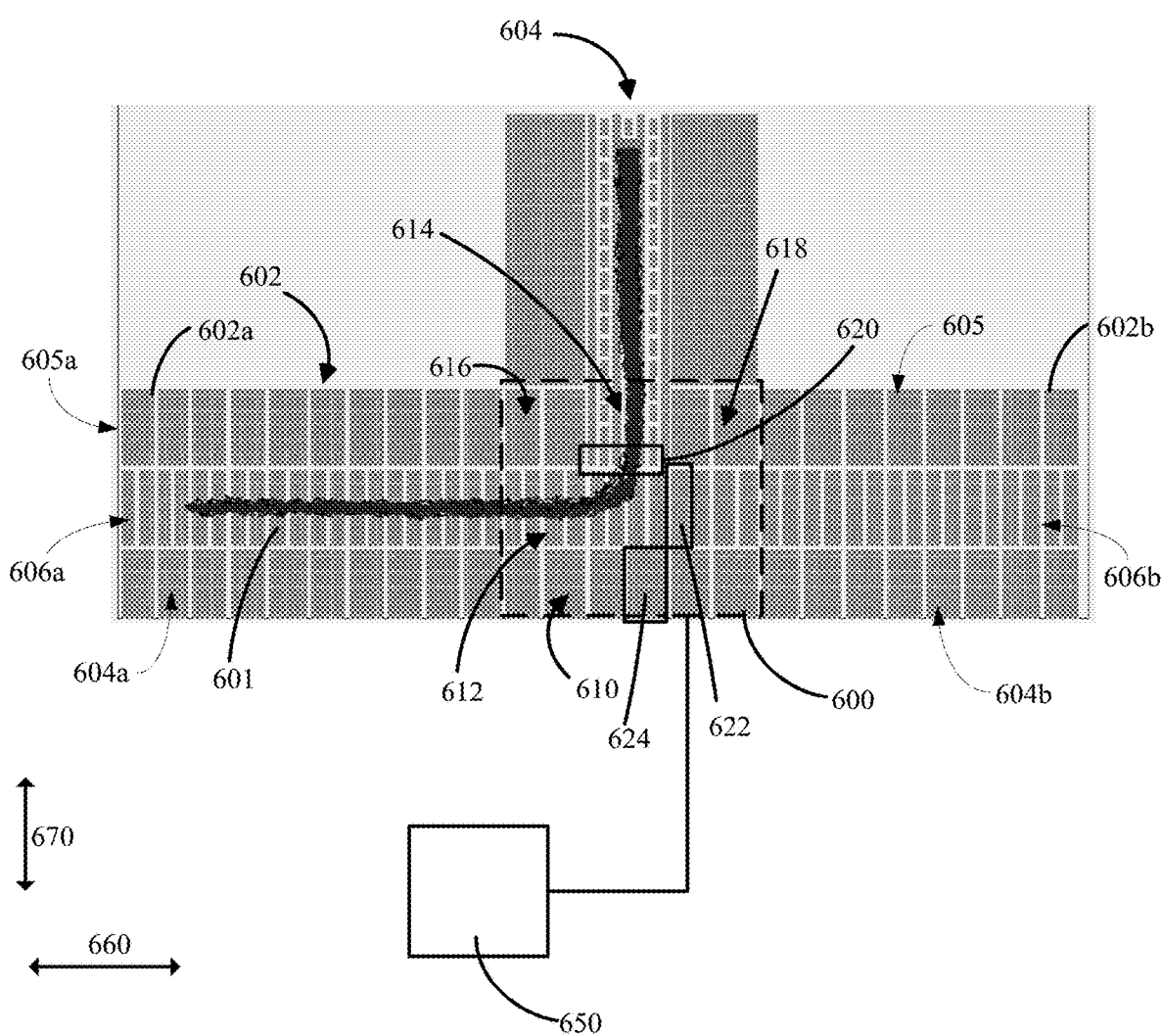
FIG. 8 is a schematic representation illustrating a second mode of operation of the switch of FIG. 7.

FIGS. 7-8 are schematic representations illustrating another example switch 600 that couples a constant-field SLIM 602 with a traveling wave SLIM 604. The constant-field SLIM 602 and the traveling wave SLIM 604 can be constructed in a similar manner as the constant-field SLIM 502 and traveling wave SLIM 504, respectively, of FIG. 5. FIG. 7 illustrates the switch 600 in a first mode of operation and FIG. 8 illustrates the switch 600 in a second mode of operation, as described herein.

The switch 600 can comprise an array of guard electrodes 610 similar to the array of guard electrodes 510 of switch 500 and an array of rung electrodes 612 similar to the array of rung electrodes 512 of switch 500. The guard electrodes 610 can be positioned adjacent and parallel to the rung electrodes 612 (e.g., below the rung electrodes 612 in the orientation of FIGS. 7-8). The switch 600 can further comprise electrodes 614, which can be an extension of the electrodes of the traveling wave SLIM 604 (e.g., constructed similar to the arrangement of electrodes of the traveling wave SLIM 300 of FIG. 3). The switch 600 can further comprise guard electrodes 616 positioned on one side of the electrodes 614 (e.g., the left side in the orientation of FIGS. 7-8) and guard electrodes 618 positioned on the other side of the electrodes 614 (e.g., the right side in the orientation of FIGS. 7-8). The guard electrodes 616 and 618 can be similar to the guard electrodes 602a, 604a, 602b, 604b.

In a first mode of operation, as illustrated in FIG. 7, a potential can be applied to electrodes 620, which can be a subset of the electrodes 614 which are positioned closest to the electrodes 612. This potential applied to electrodes 620 can create a potential barrier that can inhibit ions in the switch from entering the traveling wave SLIM 604. Thus, in the first mode operation, ions 601 traveling along the longitudinal axis 660 can pass from a first portion 602a of the constant-field SLIM 602, through the switch 600, and into a second portion 602b of the constant-field SLIM 602.

In a second mode of operation, as illustrated in FIG. 8, electrodes 620 can be turned off (e.g., either no potential is applied to the electrodes 620 or the potential applied to electrodes 620 is the same or similar to the potential applied to the other adjacent electrodes 614) and a potential can be applied to electrodes 622 and 624. The electrode 622 can be one of the electrodes of array 612 and the electrode 624 can be one of the electrodes of array 610. In the example of FIG. 6, the electrode 622 is positioned just past the ends of the electrodes of array 614 along direction 660 (to the right of electrode array 614 in the orientation of FIG. 8). Thus, the potential generated by the electrode 622 can act as a potential barrier that can inhibit ions traveling from first part 602a of the constant-field SLIM 602 to the second part 602b of the constant-field SLIM 602. The potential generated by the electrode 624 can drive the ions from the switch 600 to the traveling wave SLIM 604. In some implementations, the constant-field SLIM 602 can be at a higher potential than the traveling wave SLIM 604. Additionally, the potential generated by the electrodes of the switch 600 can serve as a potential bridge between the constant-field SLIM 602 and the traveling wave SLIM 604. For example, the electrodes of the switch 600 that are positioned closer to the constant-field SLIM 602 can have a potential similar to that of constant-field SLIM 602, and electrodes of the switch 600 that are positioned closer to the traveling wave SLIM 604 can have a potential similar to that of the traveling wave SLIM 604.

Figure 9:
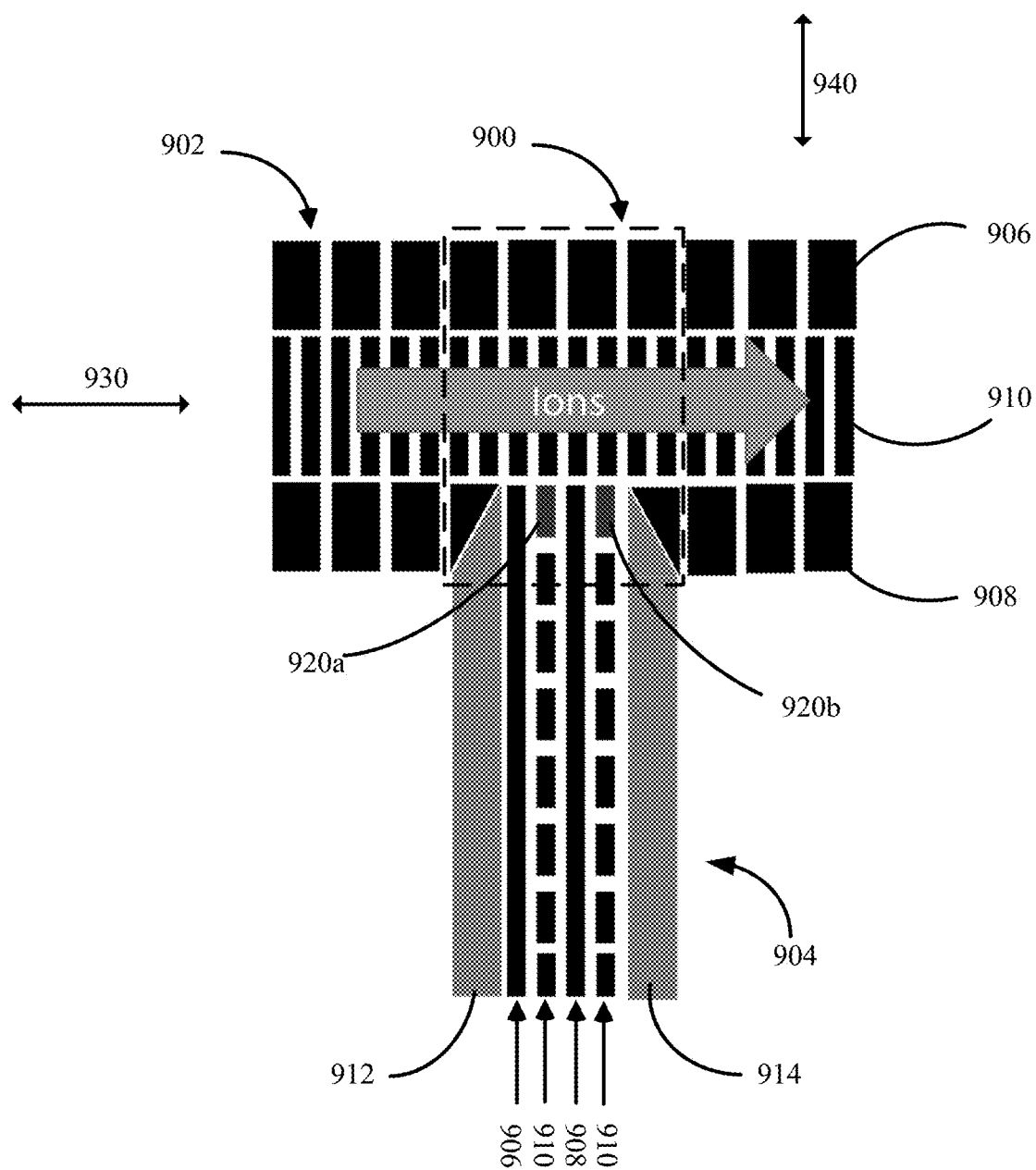
FIG. 9 is a schematic representation illustrating a first mode of operation of another exemplary switch that integrates a constant-field SLIM device with a traveling wave SLIM device.
Figure 10:
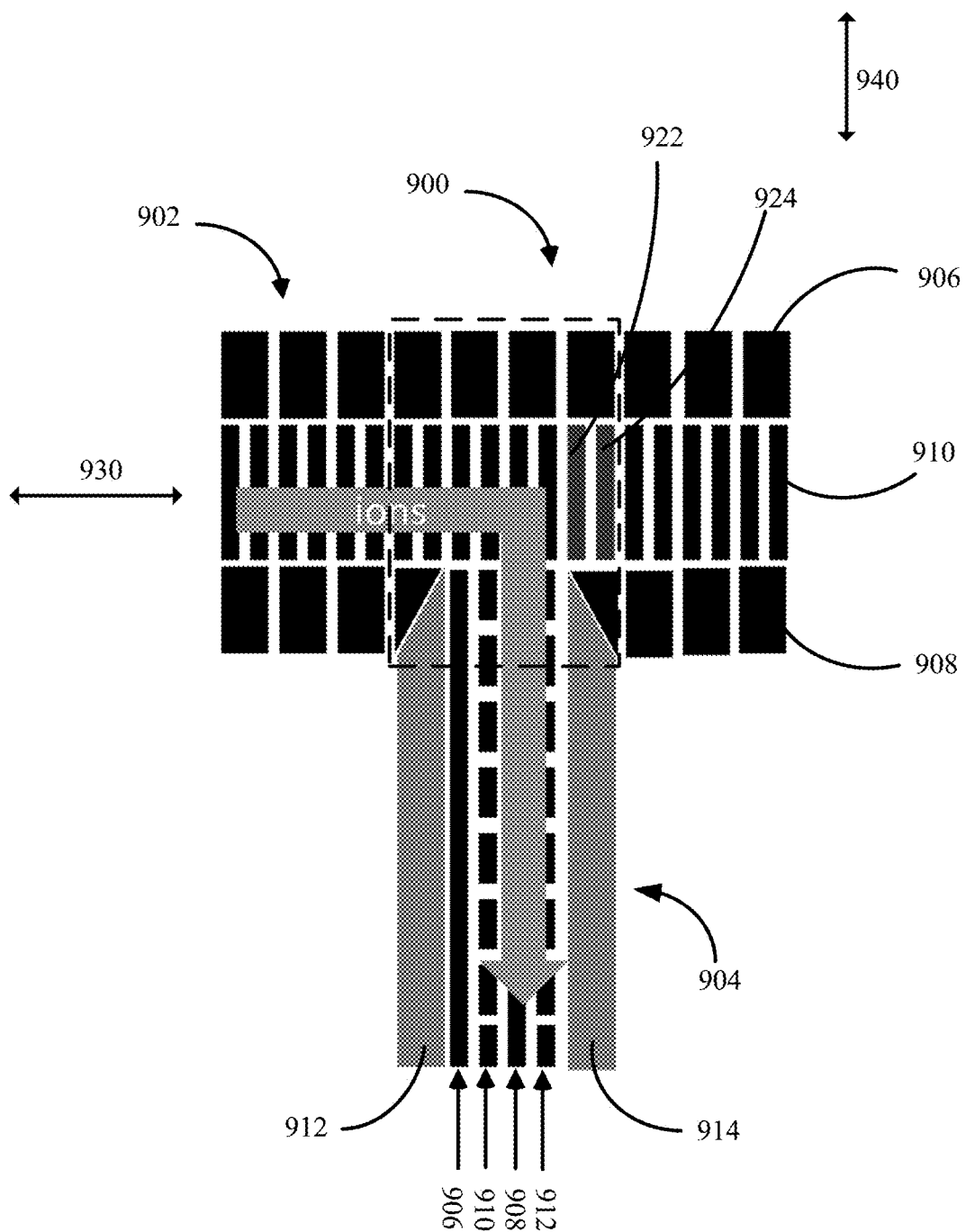
FIG. 10 is a schematic representation illustrating a second mode of operation of the switch of FIG. 9.

FIGS. 9-10 show a schematic representation illustrating of an exemplary switch 900 that integrates a constant-field SLIM 902 with a traveling wave SLIM 904. The constant-field SLIM 902 can comprise surfaces similar to the surface 200 of FIG. 2 and the traveling wave SLIM 904 can comprise surfaces similar to the surface 300 of FIG. 3. FIG. 9 shows the switch 900 in a first mode of operation and FIG. 10 shows the switch 900 in a second mode of operation.

The constant-field SLIM 902 of FIGS. 9-10 can comprise arrays of guard electrodes 906, 908 similar to arrays of guard electrodes 220, 230 of FIG. 2 and an array of rung electrodes 910 similar to the array of rung electrodes 210 of FIG. 2. The arrays of guard electrodes 906, 908 can receive a DC voltage and generate a DC potential to confine ions in the region between the electrodes 906, 908. The array of rung electrodes 910 can receive an RF voltage and a DC gradient voltage. The DC gradient voltage can generate a potential profile that can drive ions along the longitudinal axis 930. For example, the DC voltage applied to each of the inner electrodes 910 can decrease along the longitudinal axis 930.

The traveling wave SLIM 904 can comprise guard electrodes 912, 914, similar to guard electrodes 310, 315 of FIG. 3. The traveling wave SLIM 904 can further comprise RF electrodes 906, 908, similar to RF electrodes 320, 325 of FIG. 3 and segmented electrodes 910, similar to segmented electrodes 330 of FIG. 3. RF voltages can be applied to the electrodes 906, 908 with the RF voltage applied to the electrode 906 being out of phase with the RF voltage applied to electrode 908. The segmented electrodes 910 can receive an AC voltage to generate an oscillating potential and a traveling wave that can guide ions along the length of the traveling wave SLIM 904 along direction 940.

In the first mode of operation, as illustrated in FIG. 9, the switch 900 is configured such that ions move along the constant-field SLIM 902 and through the switch 900 without entering the traveling wave SLIM 904. To accomplish this, electrodes 920a and 920b, which are the electrodes of the segmented electrodes 910 closest to the inner array of electrodes 910 of the constant-field SLIM 900, can have a constant DC voltage applied to them that is greater than the amplitude of the AC voltage applied to the other segmented electrodes 910. No AC voltage is applied to the electrodes 920a, 920b in the first mode of operation of the switch 900. Thus, the DC bias of electrodes 920a, 920b inhibits ions traveling in the constant-field SLIM 910 from turning and entering into the traveling wave SLIM 904 and instead ions continue to travel along the path of the constant-field SLIM as shown in FIG. 9.

In the second mode of operation, as illustrated in FIG. 10, the switch 900 is configured such that ions traveling along the constant-field SLIM 902 and through the switch 900 will enter the traveling wave SLIM 904. To accomplish this, one or more of the electrodes of the array of rung electrodes 910 near the junction with the traveling wave SLIM 904 (e.g., electrodes 922, 924) can have a DC voltage applied that is higher than the DC voltage applied to the other electrodes of the array of rung electrodes 910. This can create a DC potential that can inhibit ions from continuing to advance along the constant-field SLIM 902 and force the ions into the traveling wave SLIM 904. Under normal operation of the constant-field SLIM 902 (e.g., when operated without a switch), the electrodes of array 910 have decreasing voltages applied to them moving from left to right in FIG. 10 along axis 930. However, in the second mode of operation in the example of FIG. 10, electrodes 922 and 924, which are positioned just past the opening to the traveling wave SLIM 904, have a greater voltage applied to them than the voltage that is applied to them during normal operation. Thus, in the second mode of operation, ions entering the constant-field SLIM 902 from the left as shown in FIG. 10 will be guided from left to right along axis 930 by the decreasing voltages of the electrodes 910 until the ions approach electrodes 922 and 924. Because electrodes 922, 924 have a higher voltage than adjacent electrodes, these electrodes will create a potential barrier which will prevent the ions from continuing to advance along the constant-field SLIM 922 past the electrodes 922, 924 and will instead force the ions into the traveling wave SLIM 904. In the illustrated example of FIGS. 9-10, the electrodes 920a, 920b and the electrodes 922, 924 can be "turned on" and "turned off" by having the voltages described above applied or not applied to switch between the first mode of operation described with respect to FIG. 9 and the second mode of operation described with respect to FIG. 10.

Figure 11:
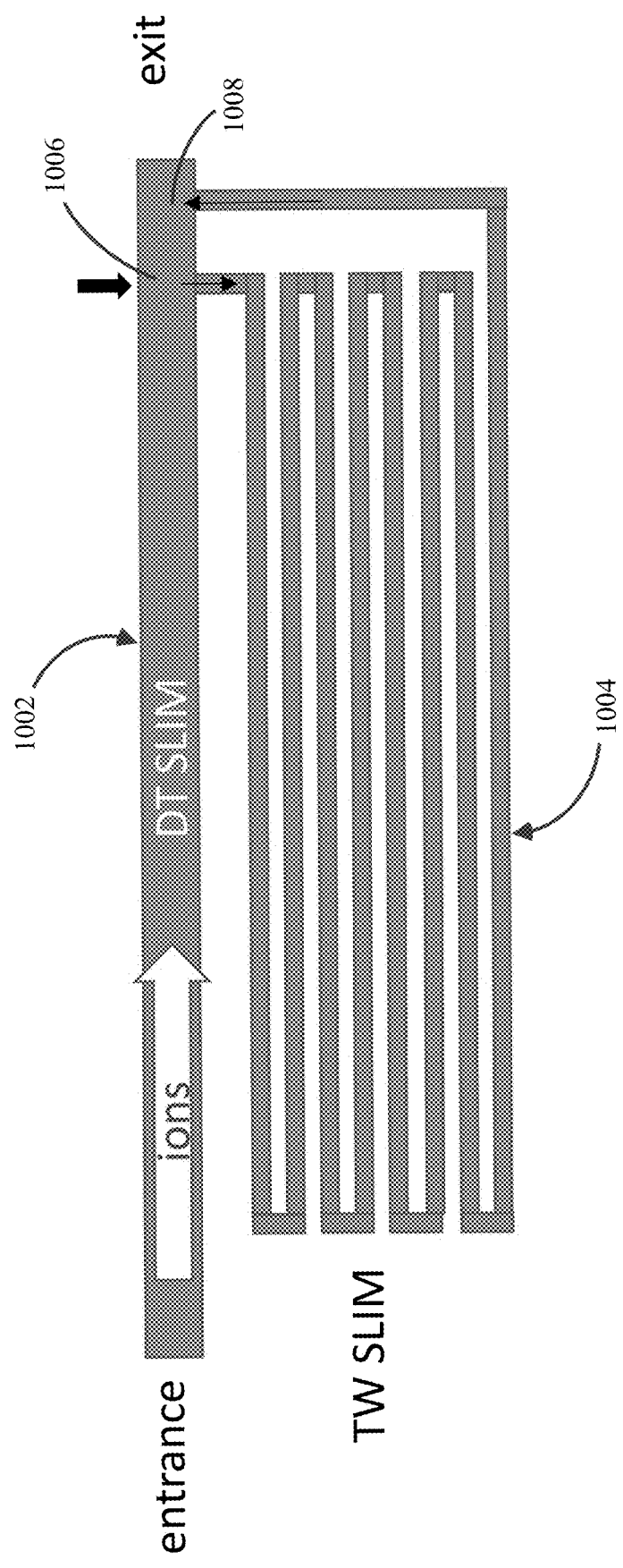
FIGS. 11-13 are schematic representations of exemplary couplings between a constant-field SLIM device and a traveling wave SLIM device located in a plane.
Figure 12:
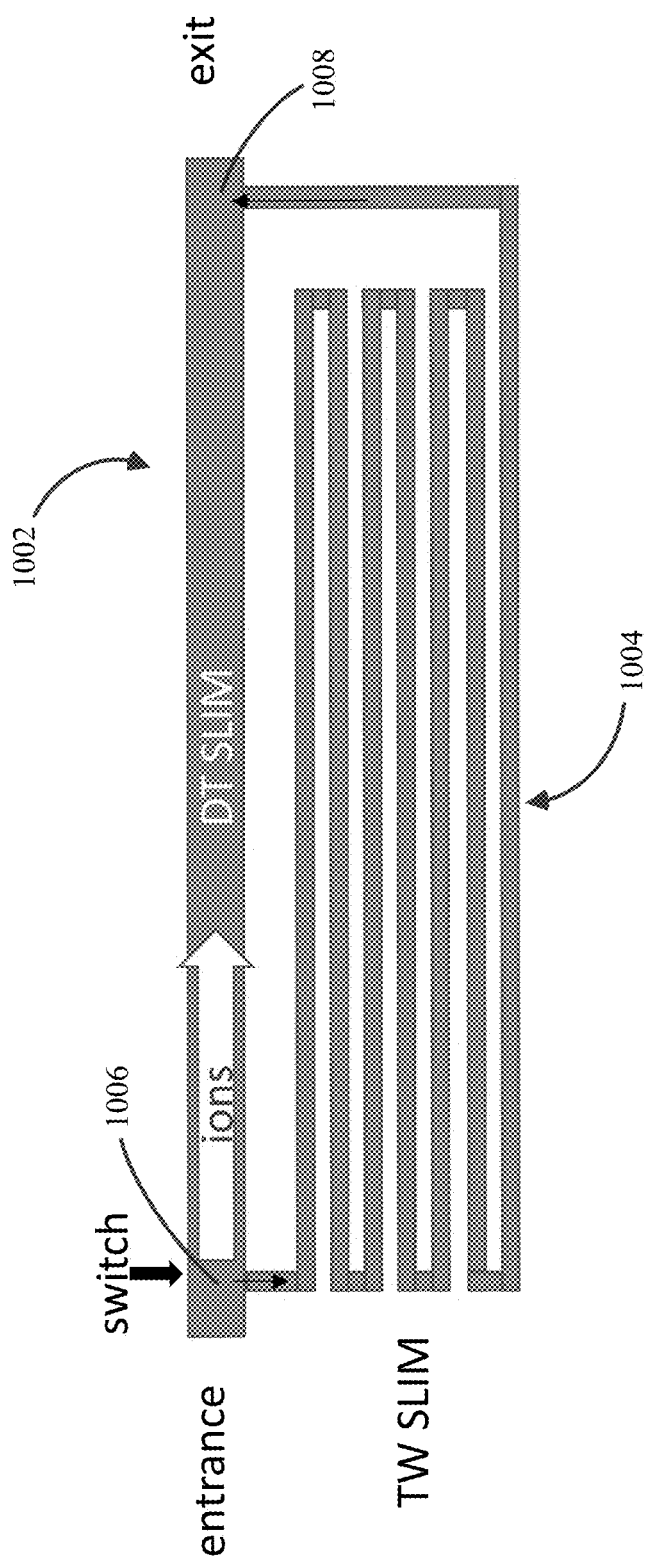
Figure 13:
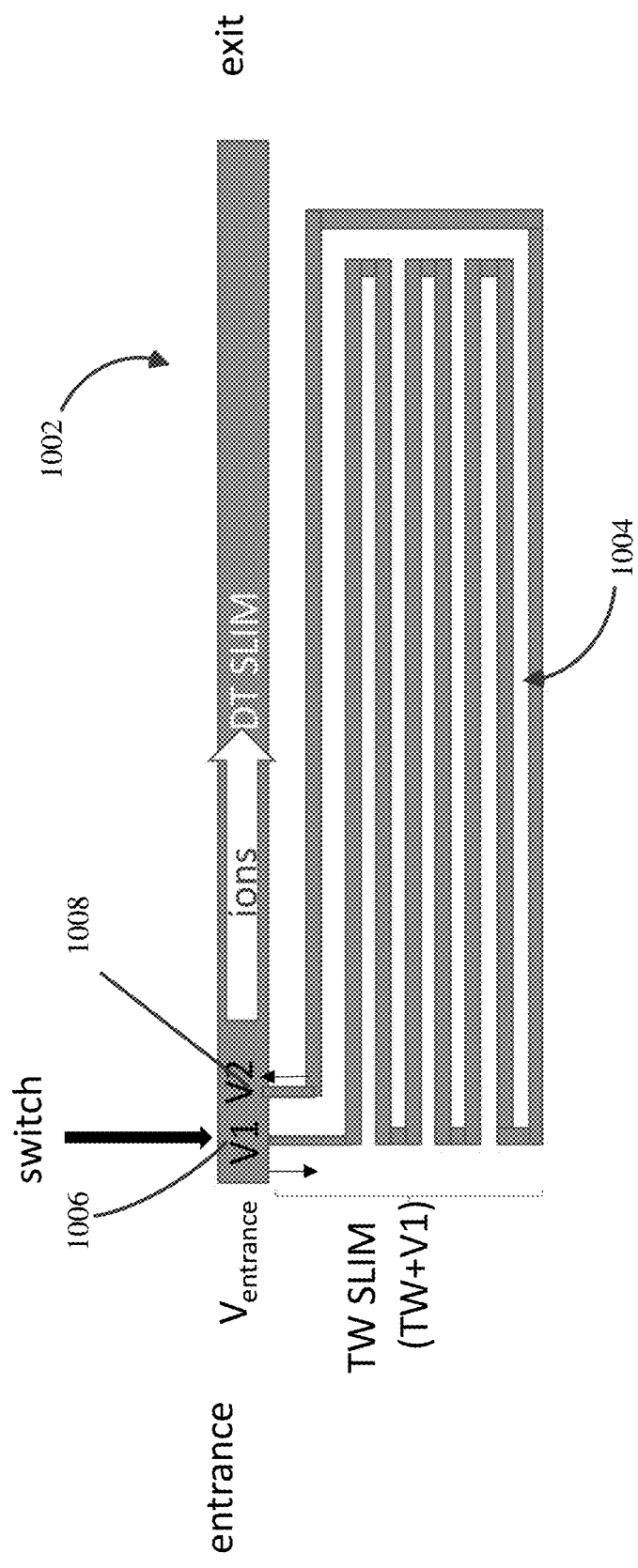

FIGS. 11, 12 and 13 are schematic representations of an exemplary coupling between a constant-field SLIM and a traveling wave SLIM located in a plane. The examples of FIGS. 11-13 comprise a constant-field SLIM 1002 similar to the constant-field SLIM 200 discussed in connection with FIG. 2 and a traveling wave SLIM 1004 similar to the traveling wave SLIM 300 discussed in connection with FIG. 3. The example constant-field SLIM 1002 has an entrance where ions enter the SLIM and an exit where ions exit the SLIM. In the examples of FIGS. 11-13, the constant-field SLIM 1002 is coupled to the traveling wave SLIM 1004 at two coupling locations 1006, 1008. Ions can enter the traveling wave SLIM 1004 from the constant-field SLIM 1002 at coupling location 1006 and ions can exit the traveling wave SLIM 1004 and reenter the constant-field SLIM 1002 at coupling location 1008. The two coupling locations 1006, 1008 can include a switch (e.g., switch 500, 600, 900). The switch at coupling location 1006 can direct ions from the constant-field SLIM 1002 to the traveling wave SLIM 1004 and the switch at coupling location 1008 can direct ions from the traveling wave SLIM 1004 to the constant-field SLIM 1002. In each of the examples in FIGS. 11, 12, and 13, the coupling locations 1006, 1008 are located at different positions with respect to the constant-field SLIM 1002 and the traveling wave SLIM 1004 as discussed below.

In the example of FIG. 11, coupling locations 1006 and 1008 are each located close to the exit of the constant-field SLIM 1002. In the example of FIG. 12, the first coupling location 1006 is located close to the entrance of the constant-field SLIM 1002, and the second coupling location 1008 is located closed to the exit of the constant-field SLIM 1002. In the example of FIG. 13 coupling locations 1006 and 1008 are each located close to the entrance end of the constant-field SLIM 1002.

Figure 14:
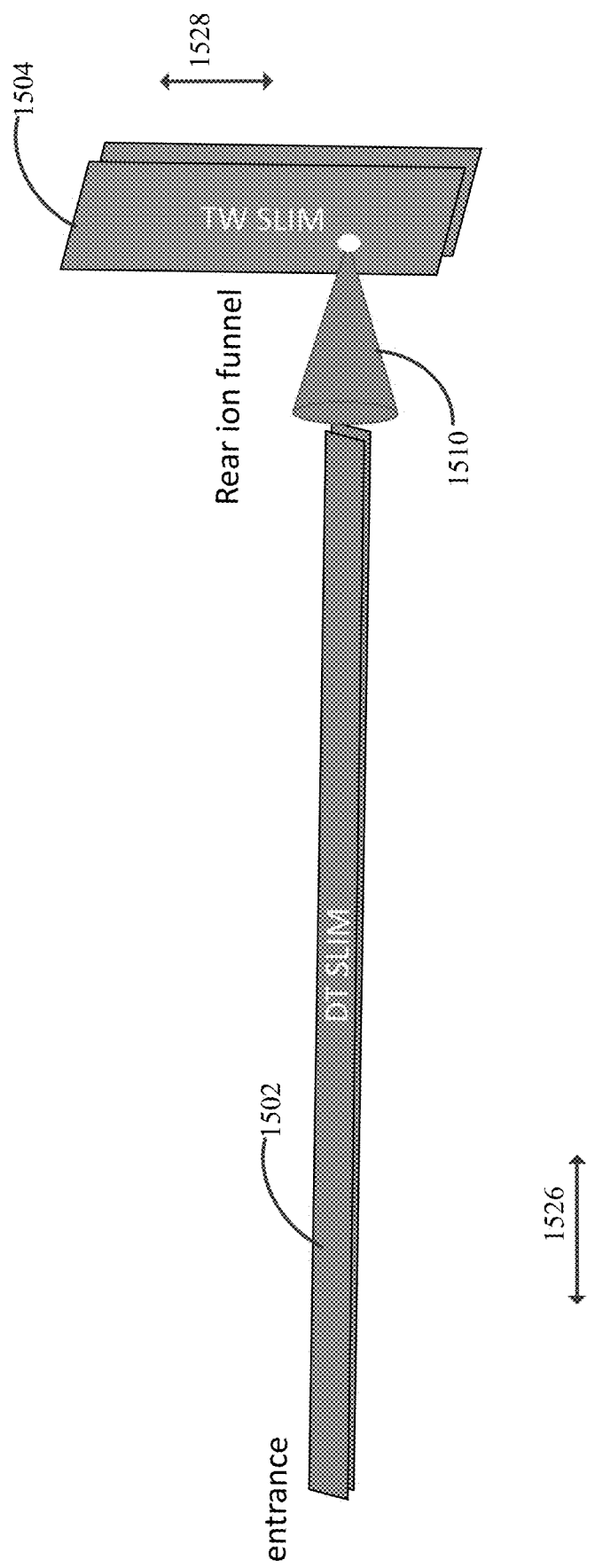
FIGS. 14-15 are schematic illustrations of a coupling between a constant-field SLIM and a traveling wave SLIM that are located in different planes.
Figure 15:
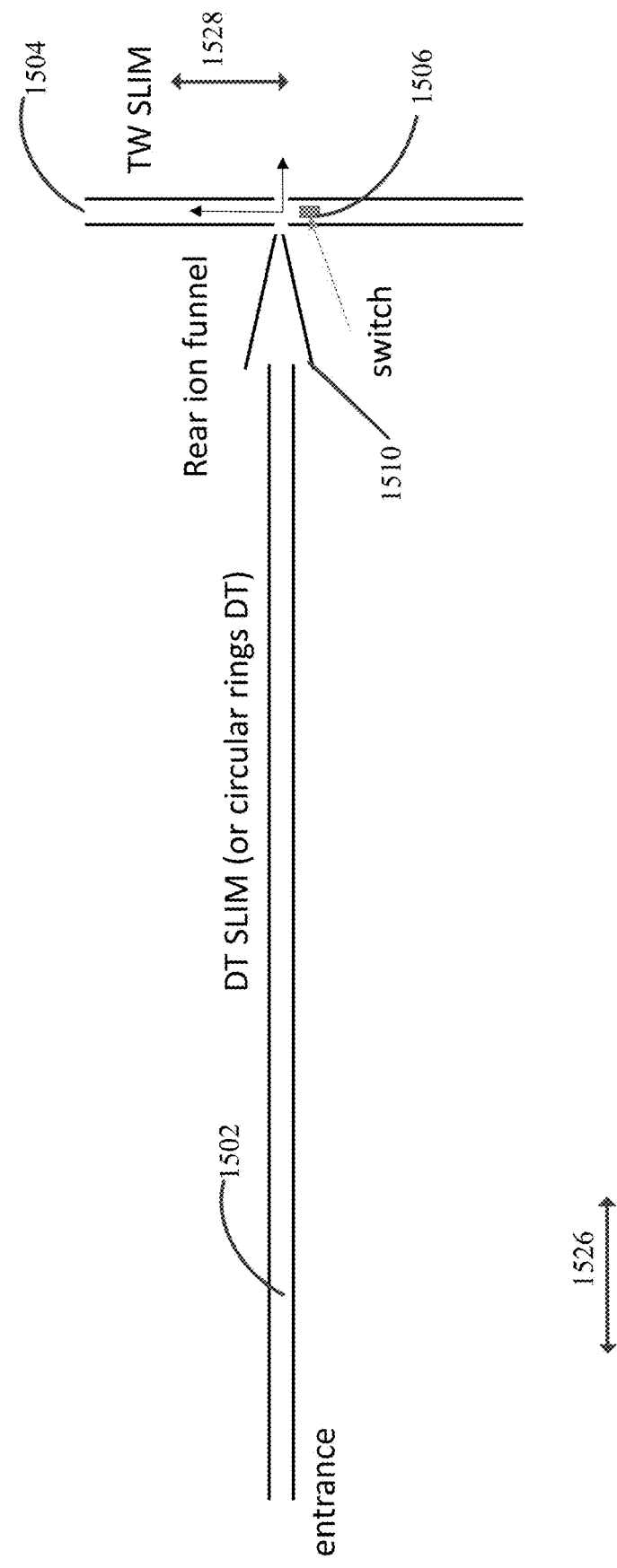

FIG. 14 is a schematic illustration of an exemplary coupling between a constant-field SLIM 1502 and traveling wave SLIM 1504 that are located in different planes (e.g., planes that are orthogonal to one another). The constant-field SLIM 1502 and the traveling wave SLIM 1504 can be similar to the example constant-field SLIM discussed in connection with FIG. 2 and the example traveling wave SLIM discussed in connection with FIG. 3, respectively. A rear funnel cone 1510 is located between the constant-field SLIM 1502 and the traveling wave SLIM 1504 to guide ions from the constant-field SLIM through an opening into the traveling wave SLIM (or vice versa). FIG. 15 provides another illustration of the constant-field SLIM 1502 and the traveling wave SLIM 1504 of FIG. 14 that includes a switch 1506. The switch 1506 can be similar to the switches discussed above (e.g., switch 500, 600, 900). In a first mode of operation, the switch 1506 can be configured such that ions traveling along the longitudinal axis 1526 of the constant-field SLIM 1502 pass through the opening of the traveling wave SLIM 1504 and continue traveling in the same direction without turning and traveling along the axis 1528 of the traveling wave SLIM. In a second mode of operation, the switch 1506 can be configured such that ions traveling along the longitudinal axis 1526 of the constant-field SLIM 1502 can pass through the opening of the traveling wave SLIM 1504 and turn and travel along the axis 1528 of the traveling wave SLIM. The first and second modes of operation of the switch 1506 can be achieved as discussed above in connection with FIGS. 5-11.

Figure 16:
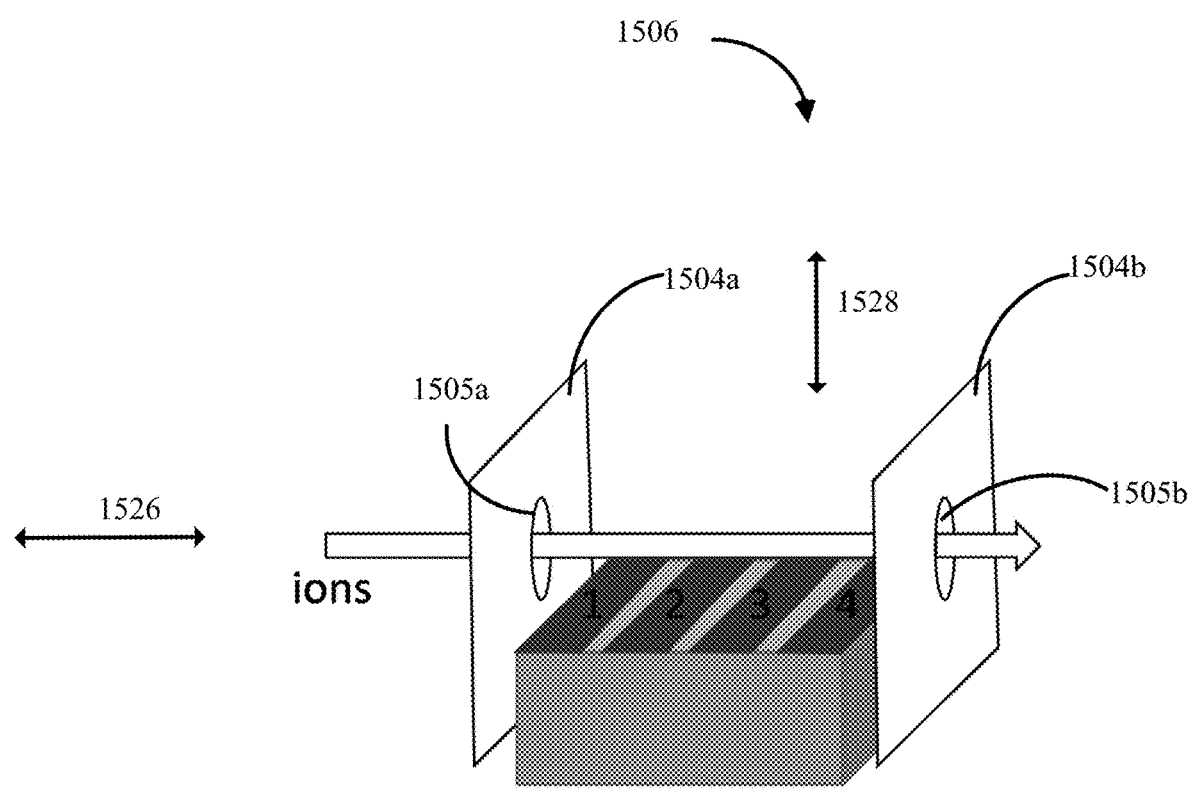
FIG. 16 is a schematic illustration of an implementation of the switch of FIG. 14.
Figure 17:
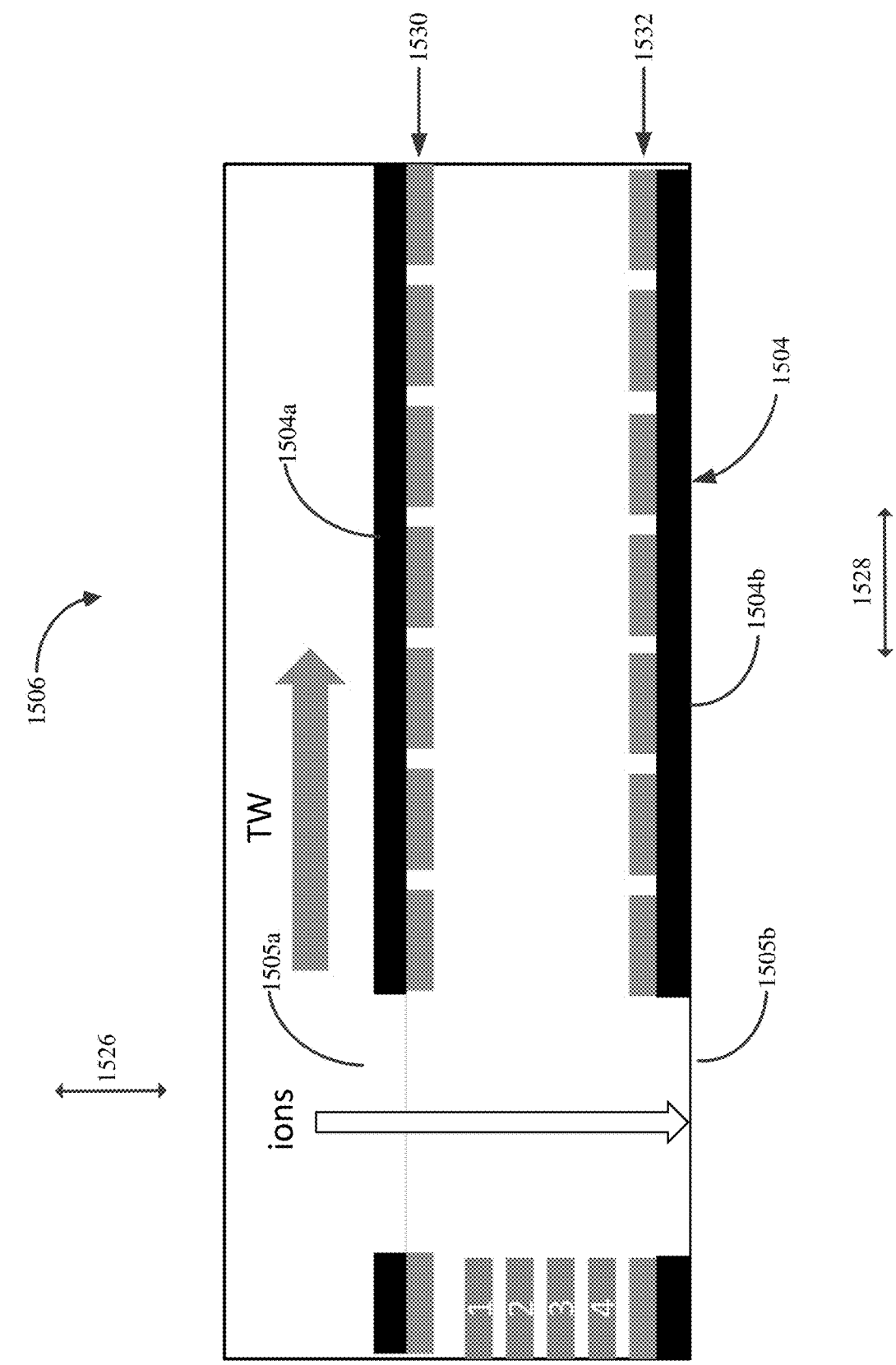
FIG. 17 is a cross-sectional view of the implementation of the switch of FIG. 16.

FIG. 16 is a schematic illustration of an implementation of the first mode of operation of the switch 1506 of FIG. 15 and FIG. 17 shows a cross-sectional view thereof. Referring to FIGS. 16 and 17, the switch 1506 can include four electrodes 1, 2, 3, 4 spaced along the longitudinal axis 1526 and attached to a dielectric substrate. The traveling wave SLIM 1504 can include two surfaces 1504a and 1504b and the switch 1506 can be located between the two surfaces. The first surface 1504a can include a first opening 1505a and the second surface 1504b can include a second opening 1505b. The traveling wave SLIM 1504 can also include arrays of electrodes 1530 and 1532, which can be similar to the segmented electrodes 330 of FIG. 3. The electrodes 1530, 1532 can have AC voltages applied to them to create a traveling wave that can guide ions that enter the traveling wave SLIM 1504, in a similar manner as described above in connection with FIG. 3.

Different voltages can be applied to electrode 1 (V1), electrode 2 (V2), electrode 3 (V3) and electrode 4 (V4). In the first mode of operation, V1 is greater than V2, V2 is greater than V3, and V3 is greater than V4. As such, ions entering the traveling wave SLIM 1504 via the opening 1505$a$ are driven along the longitudinal axis 1526 (e.g., by the electric field generated by the drop of potential from electrode 1 to electrode 4), and out of the opening 1505$b$. The ions will not turn and travel along the path between electrode arrays 1530, 1532 and are thereby not affected by the traveling wave that these electrodes create. After the ions travel through opening 1505$b$, they can enter a mass spectrometer or another ion manipulation device.

Figure 18:
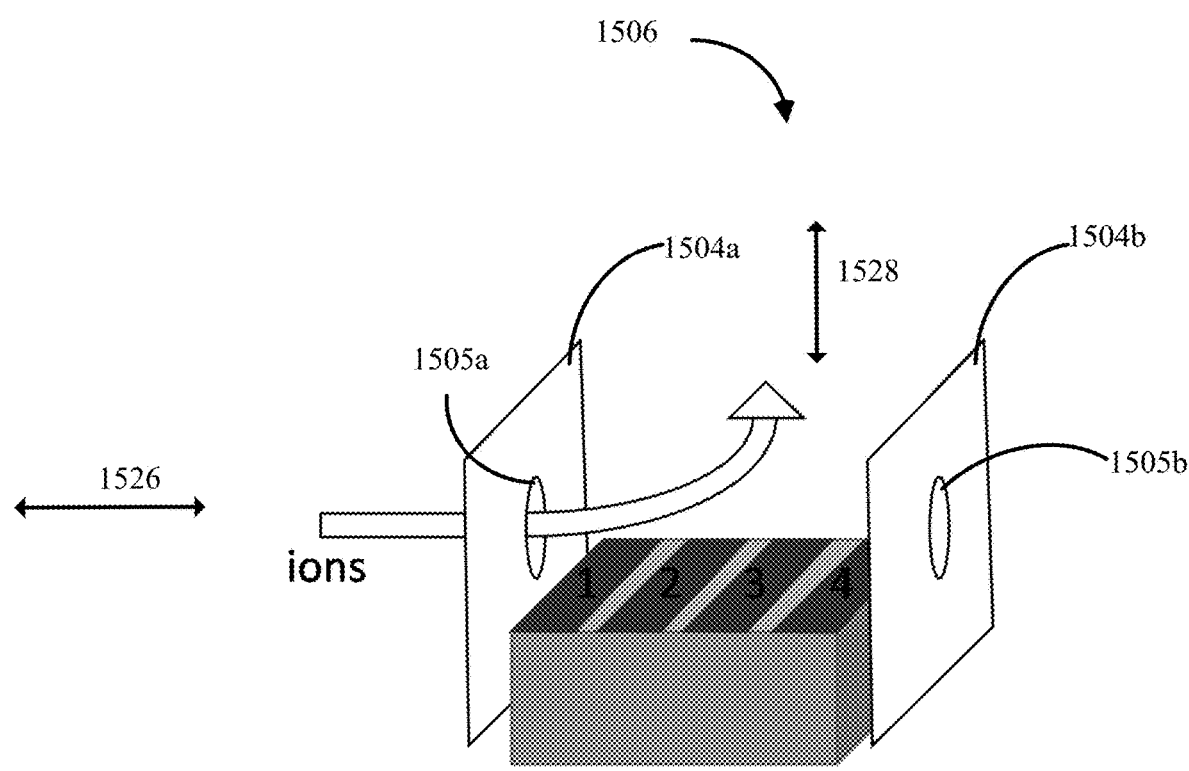
FIG. 18 is a schematic illustration of a second implementation of the switch in FIG. 14.
Figure 19:
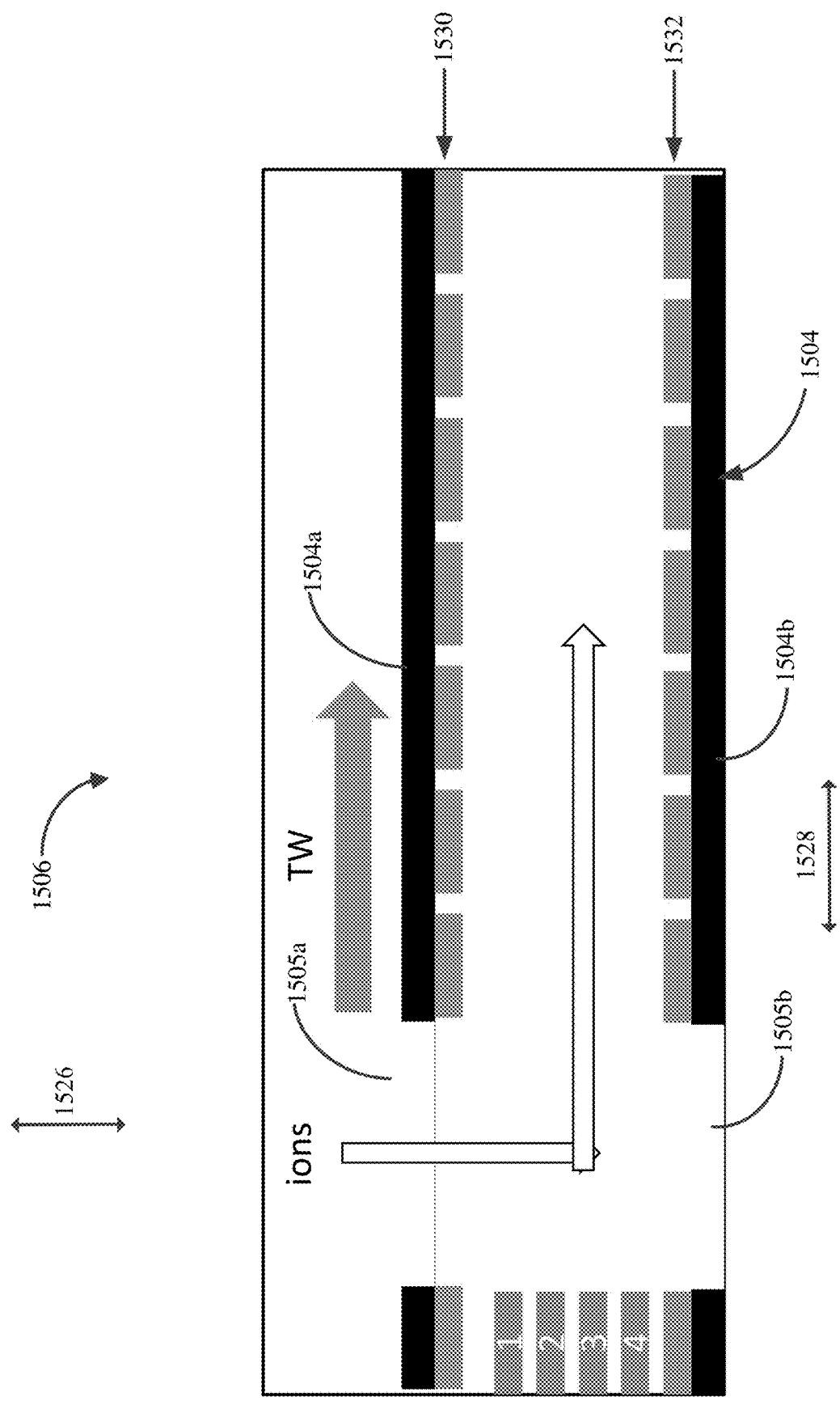
FIG. 19 is a cross-sectional view of the implementation of the switch of FIG. 18.

FIG. 18 is a schematic illustration of a second mode of operation of the switch 1506 of FIG. 15 and FIG. 19 shows a cross-sectional view thereof. Referring to FIGS. 18 and 19, the electrodes 1, 2, 3, 4 have respective voltages V1, V2, V3, and V4 applied to them as described above. However, in the example of FIGS. 18 and 19, V4 is greater than V3, V3 is greater than V2, and V2 is greater than V1. Accordingly, ions traveling along the longitudinal axis 1526 and entering the traveling wave SLIM 1504 via the opening 1505$a$ when the switch 1506 is in the second mode of operation are directed along the lateral axis 1528 (e.g., by the increase of potential from electrode 1 to electrode 4). Once the ions are between electrodes 1530 and 1532, the traveling wave generated by these electrodes guides the ions along the path of the traveling wave SLIM 1504 along axis 1528. After the ions pass through the traveling wave SLIM 1504, the can exit to a mass spectrometer or another ion manipulation device.

Figure 20:
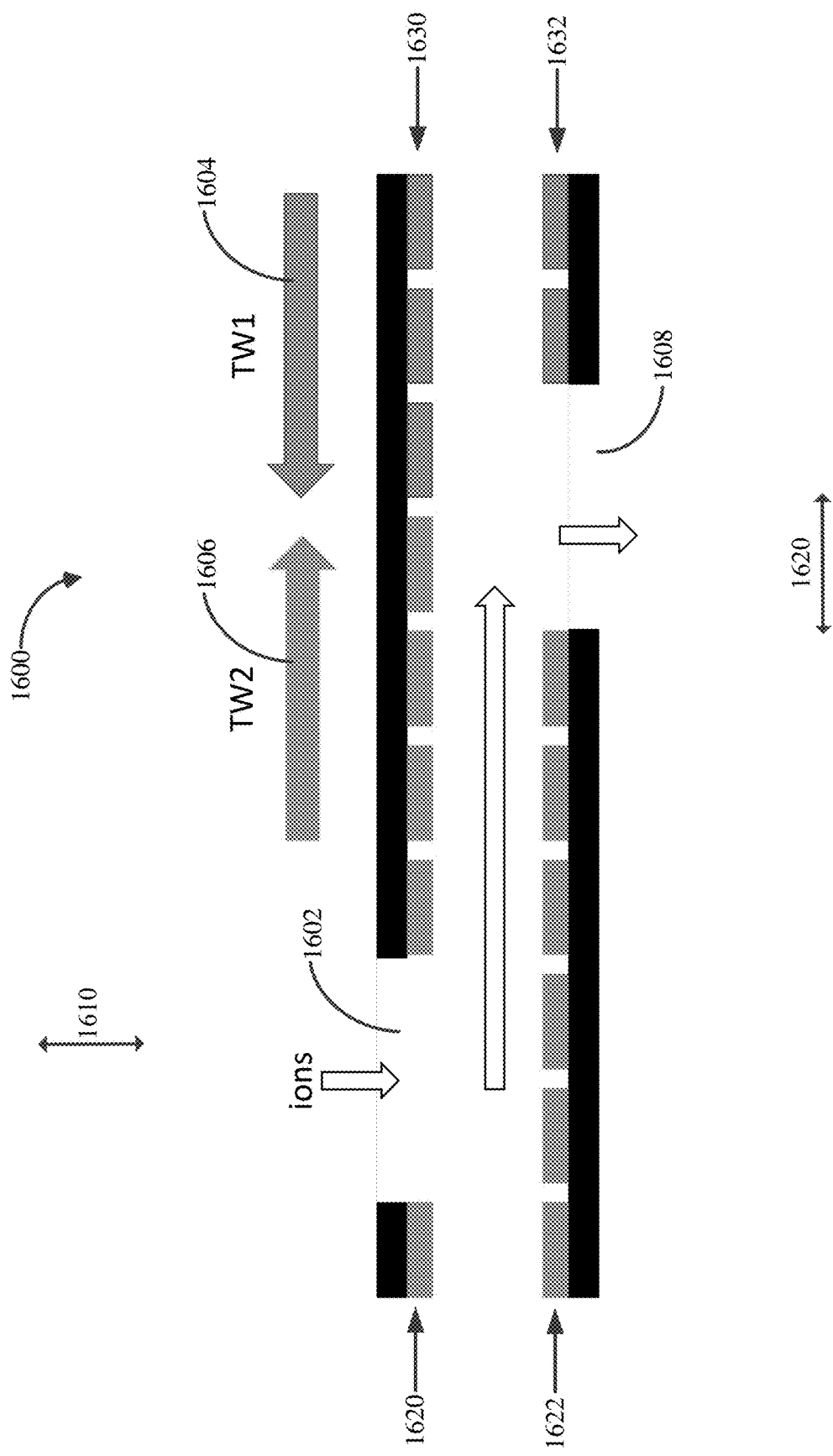
FIG. 20 is a cross-sectional view of another exemplary switch that can couple a constant-field SLIM and a traveling wave SLIM.

FIG. 20 shows a cross-sectional view of an exemplary switch 1600 that can couple a constant-field SLIM and a traveling wave SLIM that are not coaxially located. In the example of FIG. 20, as ions pass through opening 1602, a first and second set of electrons 1620, 1622 can have AC voltages applied in a similar manner as discussed above to create a traveling wave 1606 that can guide the ions along lateral axis 1620. Additionally, a third and fourth set of electrodes 1630, 1632 can have AC voltages applied to create a traveling wave 1604 directed in the opposite direction of traveling wave 1606. Accordingly, when ions guided along lateral axis 1620 by traveling wave 1606 encounter traveling wave 1604, they will be forced to pass through opening 1608, where they can then go to a mass spectrometer or another ion manipulation device.

Figure 21:
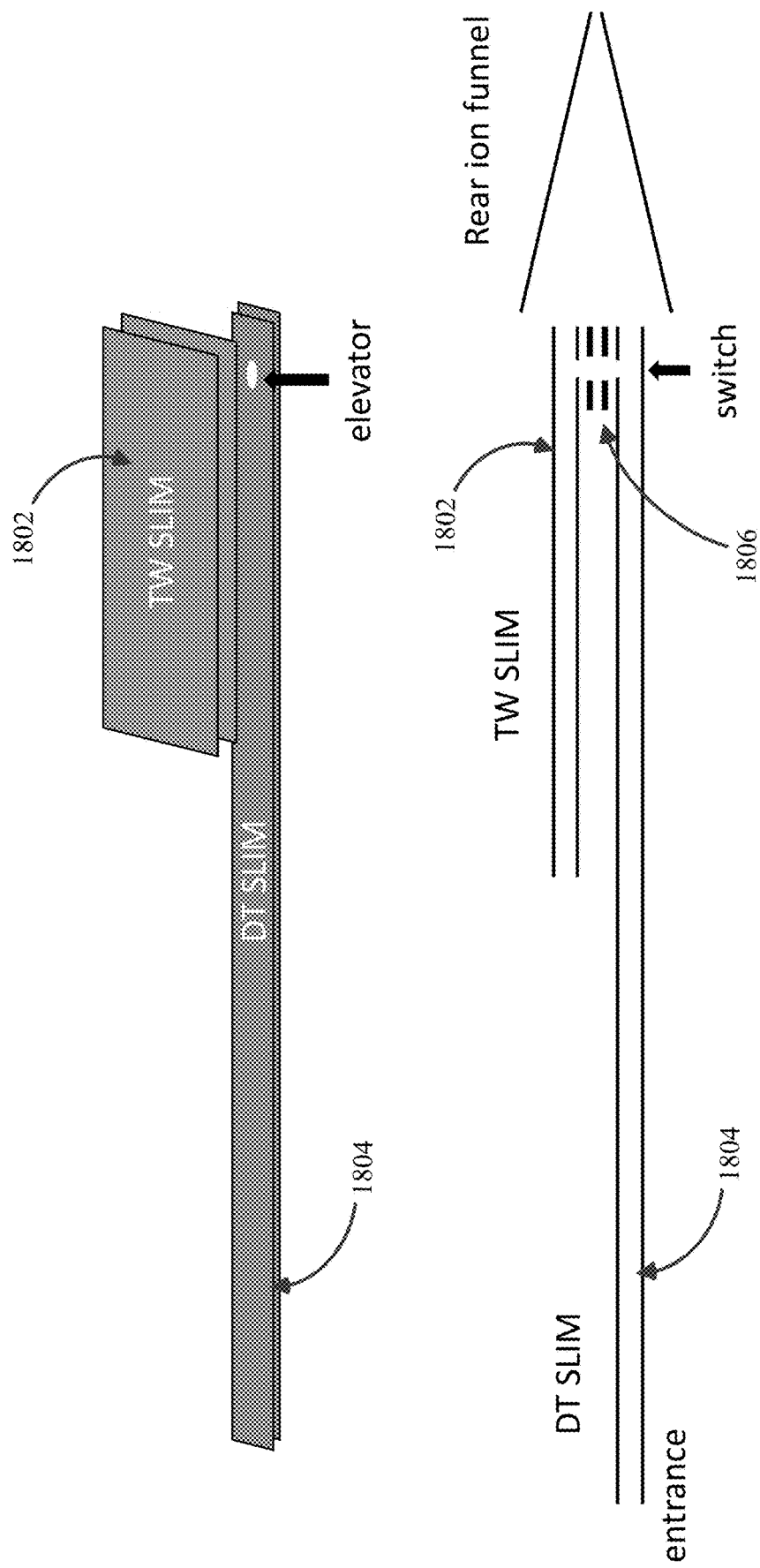
FIG. 21 is a schematic representation of an exemplary coupling between a constant-field SLIM and a traveling wave SLIM located in different planes.

FIG. 21 is a schematic representation of an exemplary coupling between a constant-field SLIM 1802 and a traveling wave SLIM 1804 located in different planes that are parallel to one another. In this implementation, a switch 1806 can guide ions from the constant-field SLIM 1802 to the traveling wave SLIM 1804 or vice versa. The switch 1806 can be constructed in a similar manner to the switches described above (e.g., switch 500, 600, 900) but oriented in such a way so as to direct the ions in the appropriate direction.

Other embodiments are within the scope and spirit of the disclosed subject matter. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, a data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The devices, methods and apparatus described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

We claim:

1. An ion manipulation device comprising:
   a constant-field portion oriented in a first direction and configured to guide ions along the first direction;
   a traveling wave portion oriented in a second direction different from the first direction and configured to guide ions along the second direction;
   a switch portion; and
   a controller coupled to the switch;
   wherein the constant-field portion and the traveling wave portion are positioned in a substantially T-shaped configuration and the switch portion is positioned at a junction between the constant-field portion and the traveling wave portion;
   wherein the constant-field portion comprises a first constant-field portion on one side of the switch and a second constant-field portion on the other side of the switch, the first constant-field portion including a first plurality of electrodes and the second constant-field portion including a second plurality of electrodes;
   wherein the traveling wave portion includes a third plurality of electrodes, the third plurality of electrodes including continuous electrodes and segmented electrodes;
   wherein the switch is configured to be operable in a first mode of operation and a second mode of operation, wherein, in the first mode of operation, ions entering the switch from the first constant-field portion move through the switch and enter the second constant-field portion, and, in the second mode of operation, ions entering the switch from the first constant-field portion move through the switch and enter the traveling wave portion;
   wherein the switch includes a fourth plurality of electrodes positioned adjacent and parallel to the first and second plurality of electrodes of the constant-field portion; and
   wherein the switch includes a fifth plurality of electrodes comprising portions of the continuous electrodes of the traveling wave portion and additional segmented electrodes positioned adjacent and parallel to the segmented electrodes of the traveling wave portion.

2. The device of claim 1, wherein the constant-field portion comprises:
   a first surface and a second surface;
   inner arrays of electrodes coupled to each of the first and second surface, wherein the inner arrays of electrodes comprise the first plurality of electrodes and the second plurality of electrodes and are configured to receive a radiofrequency (RF) voltage generating a pseudopotential that inhibits ions from approaching either of the first or second surface; and
   outer arrays of electrodes coupled to each of the first and second surface, wherein the outer arrays of electrodes are configured to receive a DC voltage generating a DC potential, wherein the pseudopotential and the DC potential manipulate the movement of ions between the first and second surface.

3. The device of claim 1, wherein the traveling wave portion comprises:
   a first surface and a second surface,
   wherein the segmented electrodes of the traveling wave portion comprise longitudinally extending continuous electrodes coupled to each of the first and second surface, wherein each electrode of the longitudinally extending continuous electrodes is configured to receive a radiofrequency (RF) voltage,
   wherein the segmented electrodes of the traveling wave portion are coupled to each of the first and second surface and arranged in longitudinally extending sets between or adjacent to the longitudinally extending continuous electrodes, wherein each electrode of the segmented electrodes in the traveling wave portion is configured to receive an AC voltage.

4. The device of claim 1, wherein the switch comprises:
   a first and second surface;

at least one first electrode coupled to each of the first and second surface and configured to receive a first voltage and generate a first potential; and at least one second electrode coupled to each of the first and second surface and configured to receive a second voltage and generate a second potential;

wherein the first potential inhibits the motion of ions along the first direction and the second potential inhibits the motion of ions along the second direction.

5. The device of claim 4, wherein, in the first mode of operation, the at least one first electrode does not receive the first voltage and the at least one second electrode receives the second voltage; and in the second mode of operation, the at least one first electrode receives the first voltage and the at least one second electrode does not receive the second voltage.

6. The device of claim 4, wherein the switch comprises:

first inner arrays of electrodes including the fourth plurality of electrodes coupled to each of the first and second surface, oriented along the first direction, and positioned in line with inner arrays of electrodes of the constant-field portion that include the first and second plurality of electrodes;

first outer arrays of electrodes coupled to each of the first and second surface, oriented along the first direction, and positioned adjacent to the first inner arrays of electrodes and in line with at least one outer array of electrodes of the constant-field portion;

second inner arrays of electrodes including the fifth plurality of electrodes coupled to each of the first and second surface, oriented along the second direction, and positioned in line with the traveling wave portion;

second outer arrays of electrodes and third outer arrays of electrodes coupled to each of the first and second surface, wherein the second outer arrays of electrodes are positioned parallel to and adjacent to a first side of the second inner arrays of electrodes, and the third outer arrays of electrodes are positioned parallel to and adjacent to a second side of the second inner arrays of electrodes;

wherein the at least one first electrode is an electrode of the first inner arrays of electrodes; and wherein the at least one second electrode is an electrode of the second inner arrays of electrodes.

* * * * *